US008885925B2

(12) United States Patent
Cameron et al.

(10) Patent No.: US 8,885,925 B2
(45) Date of Patent: Nov. 11, 2014

(54) METHOD FOR 3D OBJECT IDENTIFICATION AND POSE DETECTION USING PHASE CONGRUENCY AND FRACTAL ANALYSIS

(71) Applicant: Harris Corporation, Melbourne, FL (US)

(72) Inventors: John T. Cameron, Palm Bay, FL (US); Timothy B. Faulkner, Palm Bay, FL (US); Morteza Akbari, Rockledge, FL (US); Jay Hackett, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 129 days.

(21) Appl. No.: 13/795,804

(22) Filed: Mar. 12, 2013

(65) Prior Publication Data

US 2014/0270476 A1 Sep. 18, 2014

(51) Int. Cl.
G06K 9/00 (2006.01)
(52) U.S. Cl.
CPC .................................. *G06K 9/00201* (2013.01)
USPC .......................................... 382/154; 382/131
(58) Field of Classification Search
CPC .... G06T 7/0075; G06T 7/0065; G06T 7/0077
USPC .................................................. 382/154, 131
See application file for complete search history.

(56) References Cited

U.S. PATENT DOCUMENTS

| 7,565,139 B2 | 7/2009 | Neven, Sr. et al. |
| 7,697,735 B2 | 4/2010 | Adam et al. |
| 2007/0159522 A1 | 7/2007 | Neven |
| 2009/0238466 A1 | 9/2009 | Golan et al. |
| 2010/0199915 A1 | 8/2010 | Pettersson et al. |
| 2010/0239144 A1* | 9/2010 | Fichtinger et al. ............ 382/131 |

OTHER PUBLICATIONS

Cao et al: "Ultrasonic liver characterization using phase congruency", IEEE, 2005.*
Pentland: "Fractal-based description of natural scenes", IEEE, 1984.*
Kovesi, P., "Phase Congruency Detects Corners and Edges"; www.csse.uwa.edu.au/~pk/research/pkpapers/phasecorners.pdf?

(Continued)

*Primary Examiner* — Ruiping Li
(74) *Attorney, Agent, or Firm* — Fox Rothschild LLP; Robert J. Sacco, Esq.

(57) ABSTRACT

Method for identifying objects within a three-dimensional point cloud data set. The method includes a fractal analysis (108) on a data set where the data set is comprised of data points (404) having positions distributed in three-dimensions. The fractal analysis facilitates identification of one or more object classes. The object class specifies a category of physical object. A phase congruency analysis (112) is then performed on the data set based on the object class identified by the fractal analysis. The phase congruency analysis is advantageously performed on an interpolated, noise reduced version of the data set (which can be obtained prior to performing the phase congruency analysis). Upon completion of the phase congruency analysis, a further object identifying step is performed based on the phase congruency analysis.

23 Claims, 20 Drawing Sheets

(56) References Cited

OTHER PUBLICATIONS

Kovesi, P., "Image Features from Phase Congruency", The University of Western Australia, Technical Report 95/4; Mar. 1994. pp. 1-31.
Psyllos, A., et al., "SIFT-Based Measurements for Vehicle Model Recognition", Proc. of the XIX IMEKO World Congress on Fundamental and Applied Metrology, Sep. 6-11, 2009, Kisbon, Portugal.
Pudney, C., et al., "A 3D Local Energy Surface Detector for Confocal Microscope Images", Intelligent Information Systems, 1995. ANZIIS-95. Proceedings of the Third Australia and New Zealand Conference on, pp. 7-12, Nov. 27, 1995.
Hacihaliloglu, I., et al., "Enhancement of Bone Surface Visualization From 3D Ultrasound Based on Local Phase Information", Ultrasonsics Symposium, 2006, IEEE, pp. 41-24, Oct. 2-6, 2006.

* cited by examiner

Level 2 Fractal

| Pattern Reference Number | Sub-volume no. $302_0$ | Sub-volume no. $302_1$ | Sub-volume no. $302_2$ | Sub-volume no. $302_3$ | Sub-volume no. $302_4$ | Sub-volume no. $302_5$ | Sub-volume no. $302_6$ | Sub-volume no. $302_7$ |
|---|---|---|---|---|---|---|---|---|
| ... | ... | ... | ... | ... | ... | ... | ... | ... |
| 99 | 0 | 1 | 1 | 0 | 0 | 0 | 1 | 0 |
| 100 | 0 | 1 | 1 | 0 | 0 | 0 | 1 | 1 |
| 101 | 0 | 1 | 1 | 0 | 0 | 1 | 0 | 0 |
| ... | ... | ... | ... | ... | ... | ... | ... | ... |
| 256 | 1 | 1 | 1 | 1 | 1 | 1 | 1 | 1 |

*FIG. 8*

| Location No. | X (lat) | Y (lon) | Z (height) | Resolution Level 1 | Resolution Level 2 | Resolution Level 3 |
|---|---|---|---|---|---|---|
| 1 | 291 | 465 | 113 | 171 | | |
| 2 | 291 | 467 | 103 | 11 | | |
| 3 | 291 | 467 | 105 | 129 | | |
| 4 | 291 | 469 | 97 | 0 | 0 | 11 |
| 5 | 291 | 477 | 103 | 11 | | |
| 6 | 291 | 479 | 103 | 3 | | |

*FIG. 9*

Example scan line of pixels in a projected image

METHOD FOR 3D OBJECT IDENTIFICATION AND POSE DETECTION USING PHASE CONGRUENCY AND FRACTAL ANALYSIS

BACKGROUND OF THE INVENTION

1. Statement of the Technical Field

The inventive arrangements relate to methods and systems for object identification and pose detection based on three-dimensional point cloud data, and more particular methods for such object identification and pose detection which are based on a combination of techniques involving analysis in the spatial domain and in the frequency domain.

2. Description of the Related Art

Three dimensional (3D) sensing systems, such as LiDAR, can generate 3D image data. For example, LiDAR systems operate by recording multiple range echoes from pulses of laser light to generate an image frame. Such data is comprised of a collection of points in three dimensional space which correspond to the multiple range echoes within a sensor aperture. The data recorded by a 3D sensing system is sometimes referred to as a three dimensional point cloud data and the data points in a 3D point cloud data are sometimes referred to as "voxels." Each voxel can represent a data point value on a regular grid in three dimensional space. In this regard, each data point in the 3D point cloud typically has an individual x, y and z value, such that the point cloud can represent an actual surface within a scene in 3D. Each point can also have an intensity value. With the foregoing information, LiDAR data can be processed to reconstruct a three-dimensional representation of a surface or terrain.

3D point cloud data can be particularly useful when the point cloud data facilitates identification of specific objects within a scene. However, the ability to consistently and accurately identify specific objects in a collection of 3D point cloud data is a complex problem and this capability is not available in conventional systems. Similarly, the ability to consistently and accurately identify the pose of a particular object is a complex problem which has not been reliably solved using current techniques. The difficulty of these object identification and pose detection tasks is increased by the absence of important data points, and/or the presence of spurious data.

SUMMARY OF THE INVENTION

Embodiments of the invention concern methods for identifying objects or classes of objects within a three-dimensional point cloud data set. The method includes performing a fractal analysis on a data set where the data set is comprised of a plurality of data points having positions distributed in three-dimensions. The fractal analysis facilitates identification of one or more object classes. The object class specifies a category of physical object. A phase congruency analysis is then performed on the data set based on the object class identified by the fractal analysis. The phase congruency analysis is advantageously performed on an interpolated, noise reduced version of the data set (which can be obtained prior to performing the phase congruency analysis). Upon completion of the phase congruency analysis, a further object identifying step is performed based on the phase congruency analysis. The invention also concerns a system for identifying one or more objects. The system includes a computer processing device programmed with a set of instructions to perform the foregoing steps.

BRIEF DESCRIPTION OF THE DRAWINGS

Embodiments will be described with reference to the following drawing figures, in which like numerals represent like items throughout the figures, and in which:

FIG. 8 is a partial listing of a table that is useful for understanding how the cube in FIG. 3 can be used to specify a plurality of three-dimensional geometric patterns.

FIG. 9 is a drawing that is useful for understanding how fractals can be used in a data compression scheme to generate a look up table.

DETAILED DESCRIPTION

Figure 1:
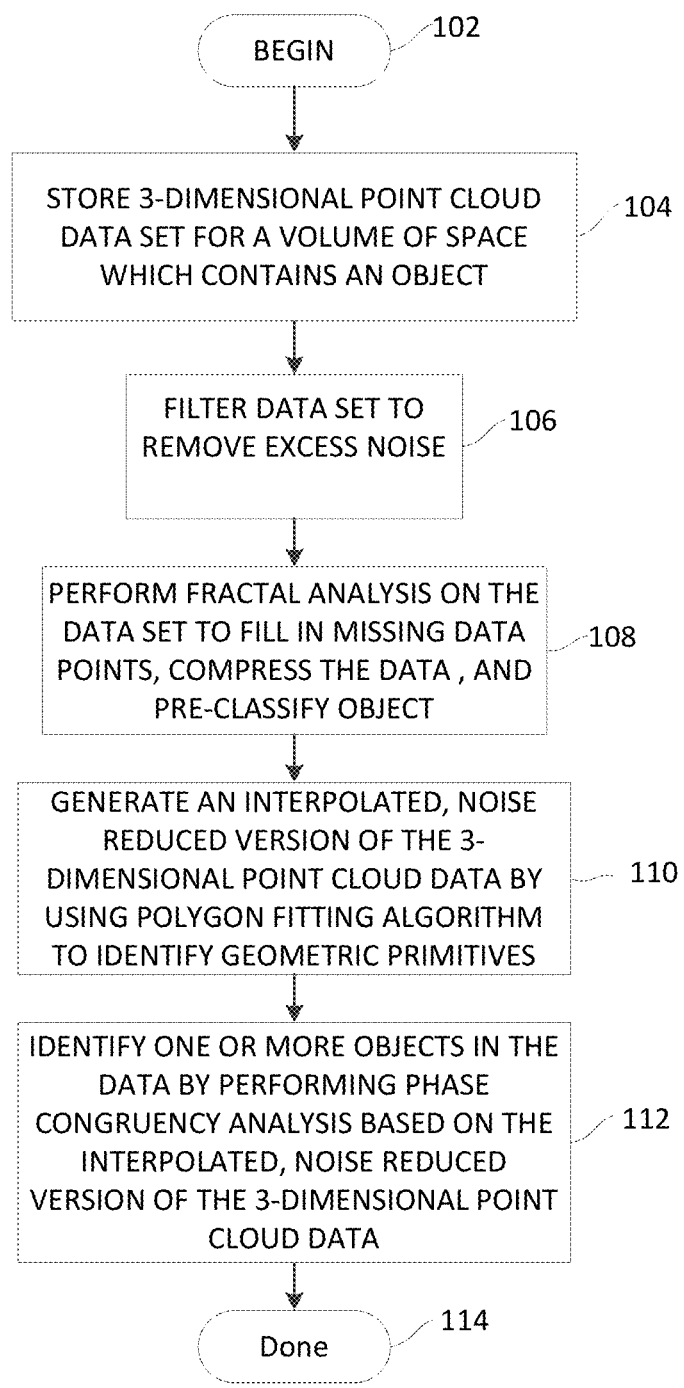
FIG. 1 is a flowchart that is useful for understanding a method for identifying objects which are modeled by a set of point cloud data.

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

The ability to consistently and accurately identify specific objects in a collection of 3D point cloud data is a complex problem and this capability is not available in conventional systems. Likewise, conventional 3D imaging systems are unable to consistently and accurately detect a pose of a particular object within a collection of 3D point cloud data. Current solutions for identification and pose detection of objects modeled by three-dimensional data use various analysis methods to find "unique features" in a data set. Popular algorithms known in the art for 2D object recognition currently include the Scale Invariant Feature Transform (SIFT) algorithm and Speeded Up Robust Feature (SURF) algorithm. The SIFT algorithm uses a spatial based analysis technique whereas the SURF algorithm utilizes sums of 2-dimensional Haar wavelet responses for feature recognition.

In general, conventional methods used for object identification generally involve one of two solutions. A first approach, used by the SIFT algorithm, examines the geometric relationship between observed feature points and compares these observed relationships to reference models. One problem with this first approach is its susceptibility to unobserved or spurious data points. A second approach, which is consistent with the SURF algorithm, compares certain identifiers associated with found feature points to lists of identifiers associated with target objects. However, a problem with this second approach is that many man-made objects will have similar key points. Moreover, the presence of noise and/or missing data will cause significant variation in identifiers, such that object classification is neither consistent nor reliable.

The present invention overcomes these limitations of the prior art by performing certain operations on the data in the spatial domain and combining those operations with a frequency domain analysis. More particularly, a fractal analysis is performed which exposes the underlying structure for an object by identifying repeated and unique three-dimensional patterns of data points. This fractal analysis is complemented by a phase-congruency analysis which searches for certain responses to custom tailored test signals. The presence of certain responses indicates the presence of specific features. These features include not only points, but also edges, lines and classes of surfaces. The combined technique facilitates the robust identification of objects, and the pose of such objects In the present invention, a computer processing device is used to perform a fractal analysis on a data set where the data set is comprised of a plurality of data points having positions distributed in three-dimensions. Based on the fractal analysis, at least one object class is identified as potentially represented by a spatial distribution of the data points. The object class specifies a category of physical objects. For example, the category of physical object can be objects that have certain three-dimensional physical characteristics that are consistent with those characteristics identified in the fractal analysis. Thereafter, a phase congruency analysis is performed on the data set based on the object class identified by the fractal analysis. The phase congruency analysis is preferably performed on an interpolated noise reduced version of the data set which is obtained prior to performing the phase congruency analysis. Upon completion of the phase congruency analysis, a further object identifying step is performed based on the phase congruency analysis. This can include confirming the object class that is represented by the data points, or identifying an object sub-class that is potentially represented by the data points (where the object sub-class specifies a category of the physical object more precisely as compared to the object class). In other embodiments, the fractal analysis identifies two or more object classes, and the further object identification step can include selecting one of the object classes based on the phase congruency analysis.

The phase congruency analysis described herein is performed at two or more orientations relative to a coordinate system in which the data points are distributed. The phase congruency responses at different orientations are summed to obtain a composite response representative of the two or more of phase congruency responses. Thereafter, a determination is made as to the correlation between the composite response and at least one predetermined reference response. This correlation step is used to facilitate the step of further identifying the object.

The phase congruency analysis described herein is advantageously performed using a wavelet based method. For example, the wavelet-based method can include the use of at least one log-Gabor type wavelet filter. In this regard, the method can include selecting at least one of a plurality of wavelet filters for the phase congruency analysis based on the object class as determined by the fractal analysis.

Referring now to FIG. 1, there is provided a flowchart which shows the major steps involved in the inventive process. The process begins in step 102 and continues on to step 104 which involves storing a collection of three-dimensional point cloud data for a volume of space. The storing step can in some embodiments also include collecting or assembling the data for the three-dimensional point cloud prior to actually storing the data in a database. Techniques for collecting and storing point cloud data are well known in the art and therefore will not be described here in detail. The data can be stored in a database or any other suitable memory location. For purposes of describing the present invention, it is assumed that the point cloud data contains at least one object.

For convenience, the three-dimensional point cloud data set is sometimes referred to herein as "the data set" or "the data". Notably, the point cloud data set is comprised of a plurality of data points, each having a defined position in three-dimensional space. For example the position of the points can be described by x, y, and z coordinates of a three-dimensional coordinate system. Still, the invention is not limited in this regard, and other methods can also be used to specify locations of points in space. Also, it should be noted that the data set can be made available as part of an existing database or by other means. Accordingly, the storing step (including data collection) can be an optional step in some embodiments of the invention.

In step 106, the method continues with filtering of the data to remove excess noise. Noise filtering methods for point cloud data are well known in the art and therefore will not be described here in detail. However, it should be understood that, for purposes of the present invention, any suitable noise filtering method can be used without limitation provided that it does not adversely affect the underlying data. In some embodiments, the data may be filtered before being stored at step 104, or can be obtained by sufficiently precise means so that filtering is not necessary prior to performing the subsequent processing steps described herein. In such embodiments, the filtering step 106 can be considered an optional step.

In step 108, processing is performed on the data to fill in missing data points and to pre-classify the object. A spatial domain type method for this purpose involves the use of fractals. In some embodiments, this step can also involve compressing the data. The data compressing can be effected by means involving the use of fractals or other suitable data compression algorithms. At the completion of this fractal analysis step, an object modeled by the point cloud data is advantageously pre-classified based on the fractal components that are identified in the data. This pre-classification step facilitates subsequent processing steps involving a phase congruency analysis. The fractal processing methods in step 108 will now be described in further detail in relation to the flowchart in FIG. 2.

Figure 2:
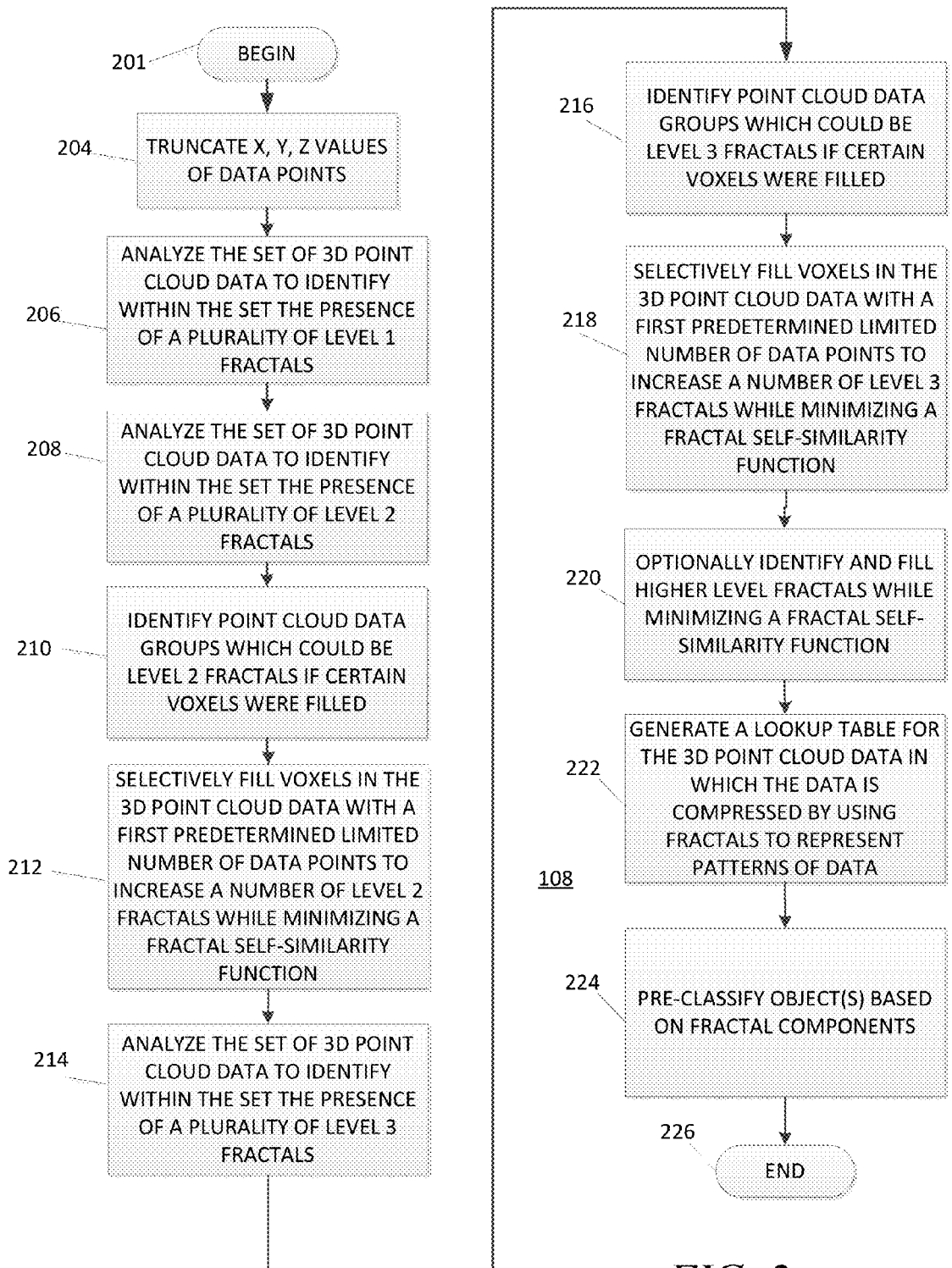
FIG. 2 is a flowchart which shows a fractal analysis portion of the process in FIG. 1.

Referring now to FIG. 2, there is provided a flowchart which describes in further detail the processing associated with step 108. Consistent and accurate identification of objects in a three-dimensional model, and detection of the pose of such objects, requires good quality high density data. Optimal post spacing will be different depending on a particular application, but once an optimal post spacing has been selected, it is desirable that at least one data point be present within each cell of a grid having the defined post spacing. Where the quality of the data is such that some cells do not contain at least one data point, it is desirable to fill in missing points. Still, it is not always apparent how such filling should be performed. Accordingly, one function of the process in FIG. 2 is to provide a method for determining which data points should be filled, and to facilitate removal of spurious data points.

Fractals are a rough or fragmented geometric shape that can be split into parts, each of which is (at least approximately) a reduced-size copy of the whole. The present invention overcomes the limitations of the prior art by using a fractal-based method for detecting and filling gaps in 3D point cloud data, while also facilitating compression and decompression of such data. This use of fractals, which is based on self-similarity, allows a cost function to be used. The voids or gaps in volumetric 3D point cloud data are filled so that the fractal self-similarity cost function is minimized. The idea is as follows: if adjacent 3D areas have a certain fractal pattern, then it is likely that the area including a missing data point will have the same pattern. A missing data point is filled in accordance with the pattern of adjacent 3D areas if (and only if) there are fractal patterns of the same type (but evaluated at a lower resolution) which include the candidate fractal pattern in which the detected gap is to be filled. The data set in the neighborhood can also be compressed as a result of filling the gap with that certain fractal pattern.

Once all of the gaps are filled, a lookup table is generated for the 3D point cloud data, and the data can be compressed by identifying patterns within patterns of data. A higher compression is achieved when there exists the same pattern within similar patterns of multiple events. Lossless compression can be achieved by the additional inclusion of an offset value for each point using Huffman encoding. The offset value is the difference between the noise filtered data and the truncated data. Lossy compression is an option with a higher compression if it is decided to waive the offset values for each point. Decompression is efficiently accomplished by expanding the fractal data patterns back to the noise filtered x, y, z format. If an offset was used, there should be no loss of information or lossless compression.

Referring again to the flowchart shown in FIG. 2 the process can begin at step 201 and continues at step 204. Step 204 is an optional step in which the x, y, and z values associated with each data point within the point cloud is truncated. Truncating the data in this way facilitates the process of identifying voids or gaps as hereinafter described. In particular, the truncation serves to align the points comprising the point cloud data to a three dimensional grid of voxels. It should be noted that three-dimensional point cloud data is now frequently formatted as an output file by data collectors in a regularly spaced grid in x, y, and z dimensions, such that truncating may not be required or desired (this eliminates the need for addressing any reduced accuracy caused by truncating). Accordingly, step 204 may not be necessary in some applications.

Figure 3B:
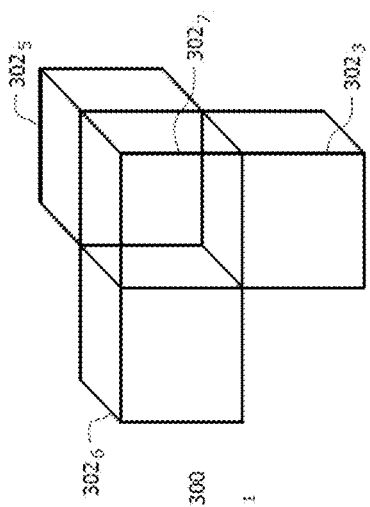
FIG. 3B is an example of one three-dimensional geometric pattern which can be defined by selecting or marking certain sub-volumes of the cube.
Figure 3A:
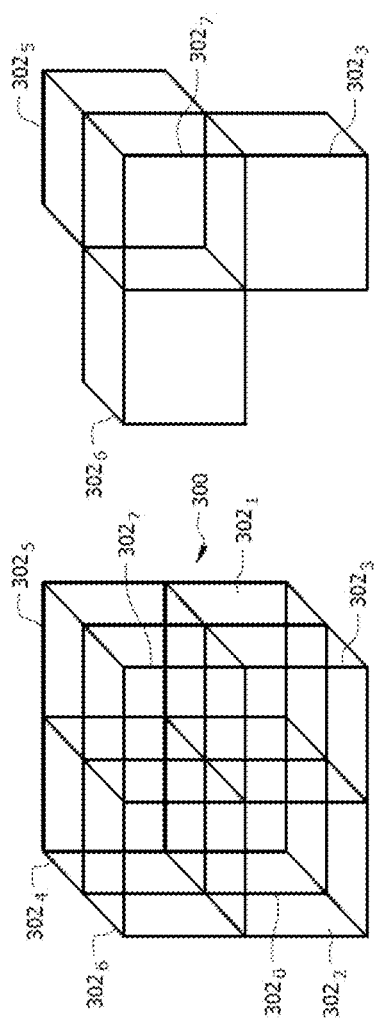
FIG. 3A is a drawing that is useful for understanding a cube formed from 8 sub-volumes that is used in the process described herein for identifying fractals.
Figure 4B:
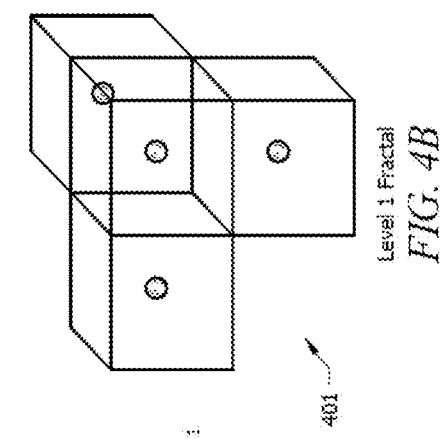
FIG. 4B is a drawing that is useful for understanding the concept of a level 1 fractal.

The process continues in step 206-208 by analyzing the set of 3D point cloud data. The point cloud data is analyzed to identify groups of data points which define fractals having one of a plurality of three dimensional patterns. This concept is more fully explained with respect to FIGS. 3A and 3B. FIG. 3A shows a cube 300 formed from eight (8) sub-volumes 3020-3027. arranged in a 2×2×2 formation. There are 256 possible three-dimensional geometric patterns that can be formed by choosing selected ones of the sub-volumes. In the example illustrated in FIG. 3B, sub-volumes 3023, 3025, 3026, and 3027 are selected or marked. The selection of these four sub-volumes in FIG. 3B specifies one of the 256 possible three-dimensional geometric patterns for cube 300. Each of the 256 possible patterns can be assigned a reference value. This concept is illustrated in FIG. 8 which shows a partial list of pattern reference numbers where marked sub-volumes 3020-3027 are indicated with a value of 1 and unmarked sub-volumes are indicated with a value of zero. The cube 300 can effectively be scanned through an entire frame of three-dimensional point cloud data to identify the presence of fractals contained therein. This scanning process is preferably performed at two or more levels of resolution as hereinafter described with respect to FIGS. 4-6.

Figure 4A:
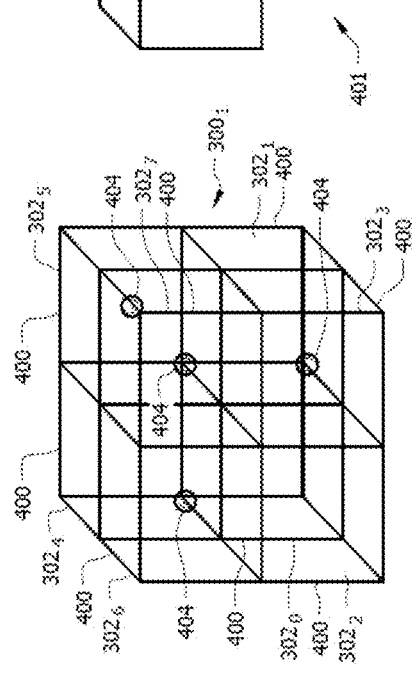
FIG. 4A is a drawing that is useful for understanding how the cube in FIG. 3 can be used for identifying certain geometric patterns at a first level of resolution.

At step 206, the point cloud data is analyzed at a first level of resolution for purposes of identifying level 1 fractals. At the first level of resolution, each sub-volume $302_0$-$302_7$ of a cube 300 can correspond to a single voxel 400. This scenario is illustrated in FIG. 4A, in which each sub-volume $302_0$-$302_7$ of a cube $300_1$ is the same size as a single voxel 400. A particular sub-volume is marked or selected when a data point 404 appears within the particular sub-volume (voxel). The cube $300_1$ is scanned through the entire set of 3D point cloud data so that all of the data is evaluated in this way. At this first level of resolution, each of the 256 three-dimensional geometric patterns is determined directly by the arrangement of the data points 404 within the cube 300 as it is scanned through the point cloud. With the foregoing scheme, the particular sub-volumes which are "marked" by the presence of data points 404 will designate one of the 256 three-dimensional geometric patterns. In the example shown in FIG. 4A, the data points 404 reside in voxels 400 which correspond to sub-volumes $302_3$, $302_5$, $302_6$, and $302_7$, thereby resulting in the fractal 401 shown in FIG. 4B. The fractals that are identified at this first level of resolution are referred to herein as level 1 fractals.

Figure 5A:
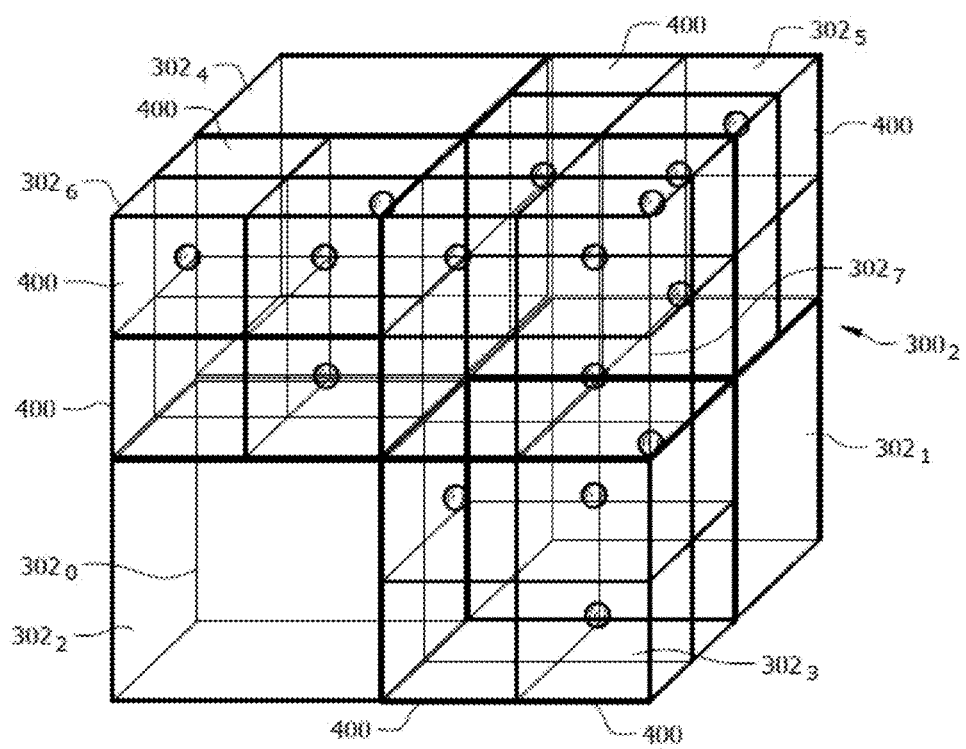
FIG. 5A is a drawing that is useful for understanding how the cube in FIG. 3 can be used for identifying certain geometric patterns at a second level of resolution.
Figure 5B:
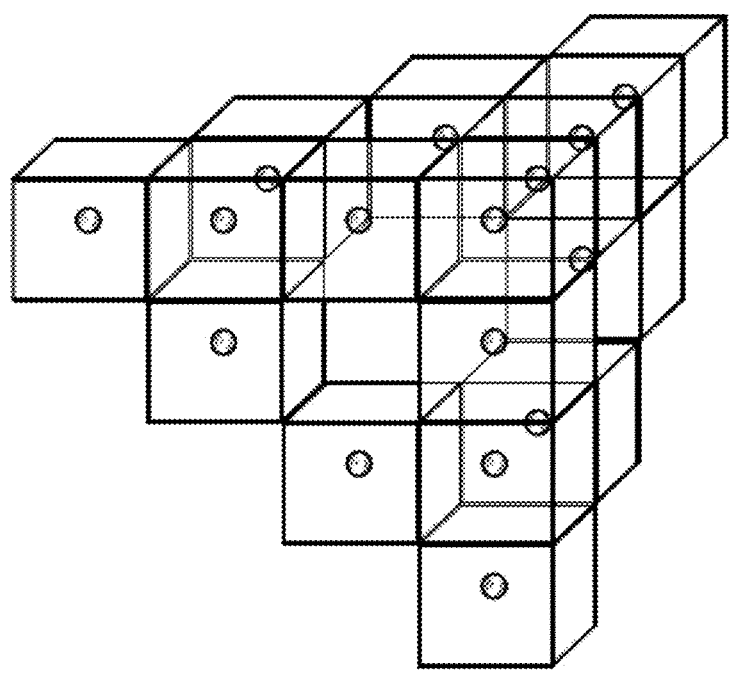
FIG. 5B is a drawing that is useful for understanding the concept of a level 2 fractal.

Once the level 1 fractals have been identified in step 206, the method continues on to step 208 for identifying level 2 fractals. Level 2 fractals are identified by scanning through the point cloud data at a second level of resolution. At the second level of resolution, the block 300 from FIG. 3 is scaled up in size so that each sub-volume $302_0$-$302_7$ will contain a block of voxels of size 2×2×2. This scenario is illustrated in FIG. 5A which shows a cube $300_2$, where each sub-volume contains eight (8) voxels. At the second level of resolution, those sub-volumes $302_0$-$302_7$ which contain the same level 1 fractal pattern will be marked. For example, in FIG. 5A, sub-volumes $302_3$, $302_5$, $302_6$, and $302_7$ all contain level 1 fractals having the same three-dimensional shape and these sub-volumes are therefore marked. The marked sub-volumes at the second level of resolution can form 256 different three-dimensional geometric patterns. The marked ones of sub-volumes $302_0$-$302_7$ can form a three-dimensional pattern in cube $300_2$ which is the same pattern as the level 1 fractals contained in the marked sub-volumes. When this occurs, the three-dimensional geometric patterns at the second level of resolution is referred to herein as a level 2 fractal. A level 2 fractal corresponding to the example shown in FIG. 5A is illustrated FIG. 5B.

Figure 6:
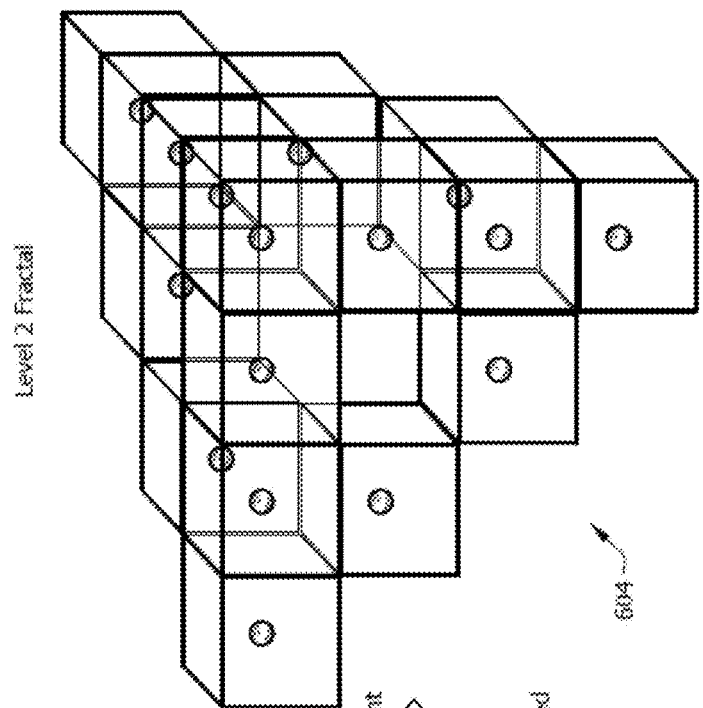
FIG. 6 is useful for understanding how fractals can be used to identify voids within point cloud data.
Figure 6:
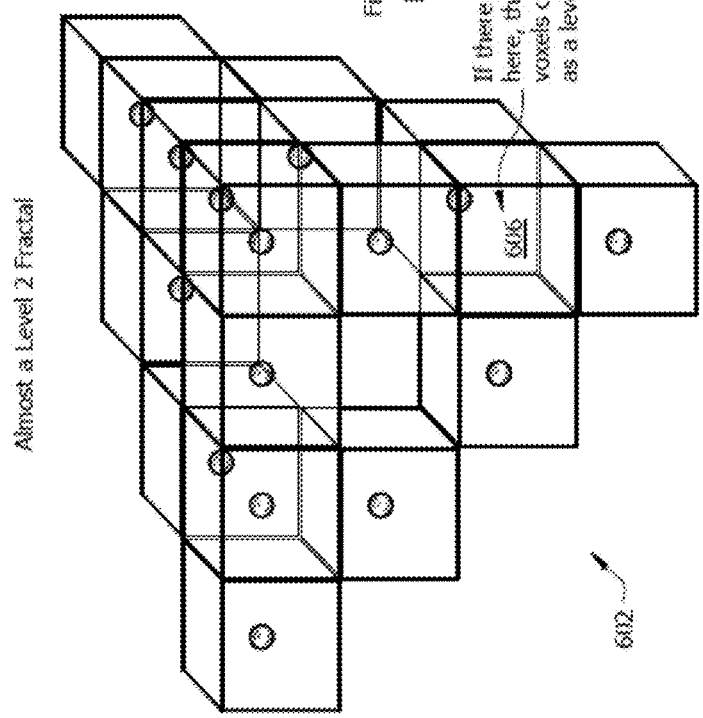

It will be appreciated that there may be many instances where the points within the point cloud can almost form a level 2 fractal, but fail to do so because of one or more missing data points. For example, this may occur when there are gaps or voids in the data. This scenario is illustrated in FIG. 6, which shows an arrangement of points 602 which almost form a level 2 fractal, but fail to do so because there is a point missing in one voxel (i.e., voxel 606 in this example). By adding the missing point in voxel 606, the pattern of points is completed so as to form a level 2 fractal 604. Adding the missing point can provide two benefits. One advantage is that the addition of the missing point allows for the entire group of points to be more efficiently represented, in this case as a level 2 fractal. Consequently, there is a data compression advantage that can be gained by point filling. More importantly, the existence of level 1 fractals having a common three dimensional pattern in several surrounding sub-volumes, and their near fit within a level 2 fractal, can serve as an indication that there is a data gap or void in voxel 600 which should be filled to more accurately represent the scene that was imaged. In this way, fractals can be used to identify voxels where a data point is not present, but nevertheless should be present. It will be appreciated that the example illustrated in FIG. 6 shows an arrangement of points 602 where a void appears in only a single voxel, and where the addition or filling with only a single point is sufficient to form a level 2 fractal. However, it should be understood that other scenarios could require that more than one point must be filled in order to form a level 2 fractal from a group of level 1 fractals.

Referring once again to FIG. 2, the process continues in step 210 with the identification of points within the point cloud data which could be level 2 fractals if certain voxels were filled. This step will generally involve setting some limitations with regard to the number of points that can be missing relative to the formation of a complete level 2 fractal. For example, step 210 can involve identification of point cloud data that is missing one point or multiple points to complete the formation of a level 2 fractal. An acceptable number of missing points can be pre-defined within a computer application, or can be selected by a program operator. Once such point cloud formations with missing points have been identified in step 210, the voxels can be selectively filled in step 212 with points as needed to form a level 2 fractal. The number of points that are filled will be determined by the predetermined acceptable number of missing points as described above.

The filling process as described herein will advantageously increase the number of level 2 fractals identified within the point cloud, while minimizing a fractal self similarity function. Basically, if there is a gap or void in the data, and the adjacent 3D areas within the point cloud have a certain level 1 fractal pattern, then it is likely that the data containing the gap should have the same pattern. Accordingly, the gap or void is filled to mimic this certain pattern if and only if there are fractal patterns of the same type at a lower resolution which include the candidate pattern in the detected gap. This filling approach has the further advantage that data in the neighborhood of the void can be compressed as a result of filling the void with that certain pattern corresponding to surrounding level 1 fractals.

Figure 7A:
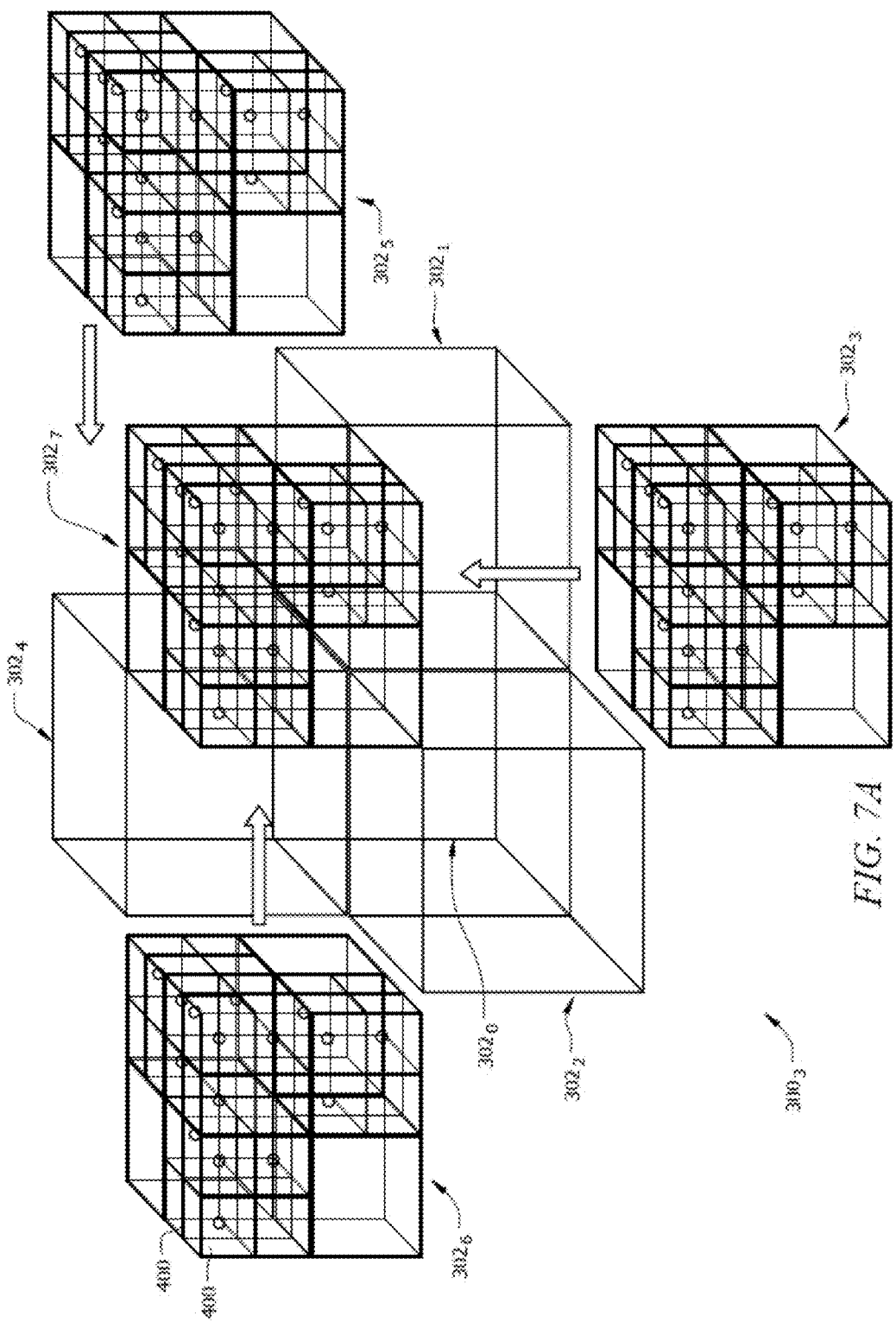
FIG. 7A is an exploded view of a drawing that is useful for understanding how the cube in FIG. 3 can be used for identifying certain geometric patterns at a third level of resolution.
Figure 7B:
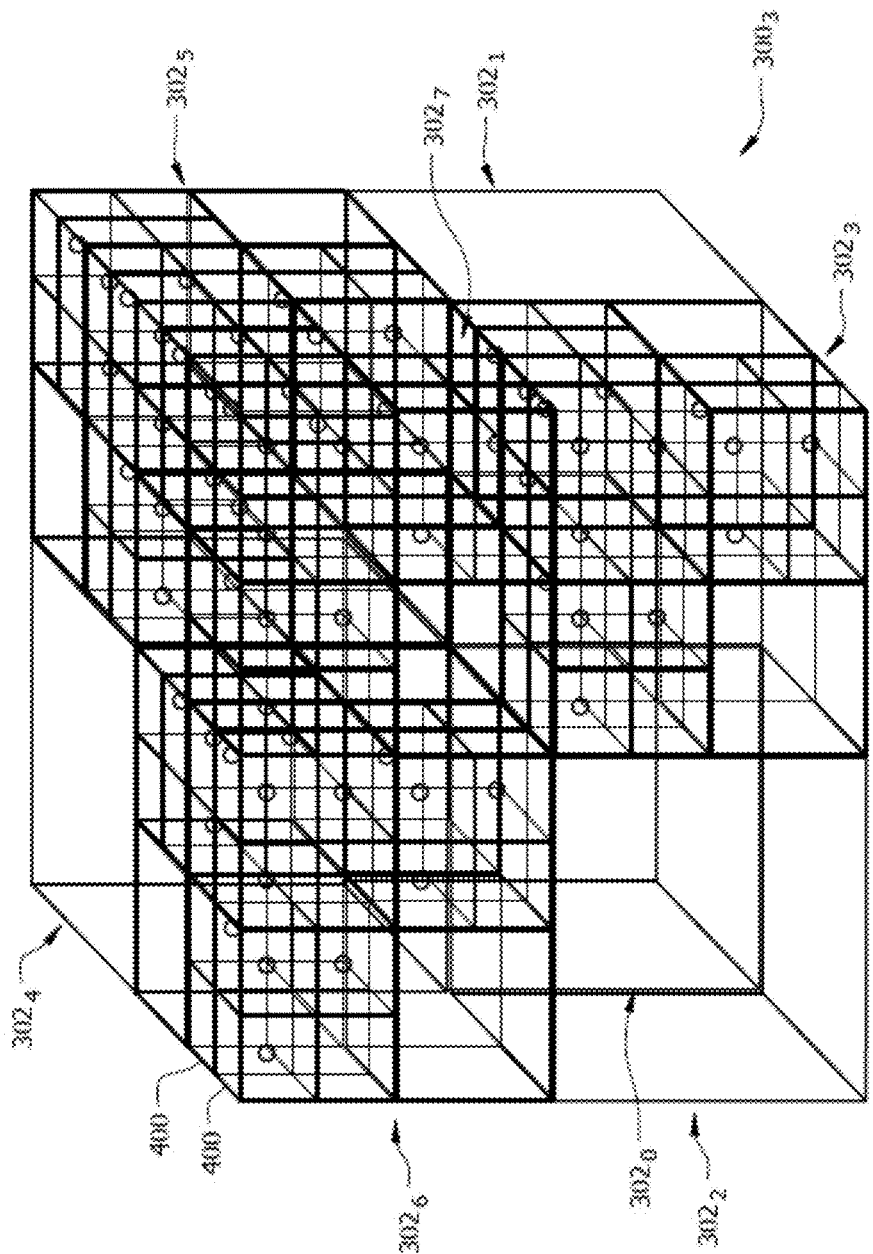
FIG. 7B is a non-exploded view of the drawing in FIG. 7 that is useful for understanding how the cube in FIG. 3 can be used for identifying certain geometric patterns at a third level of resolution.
Figure 7C:
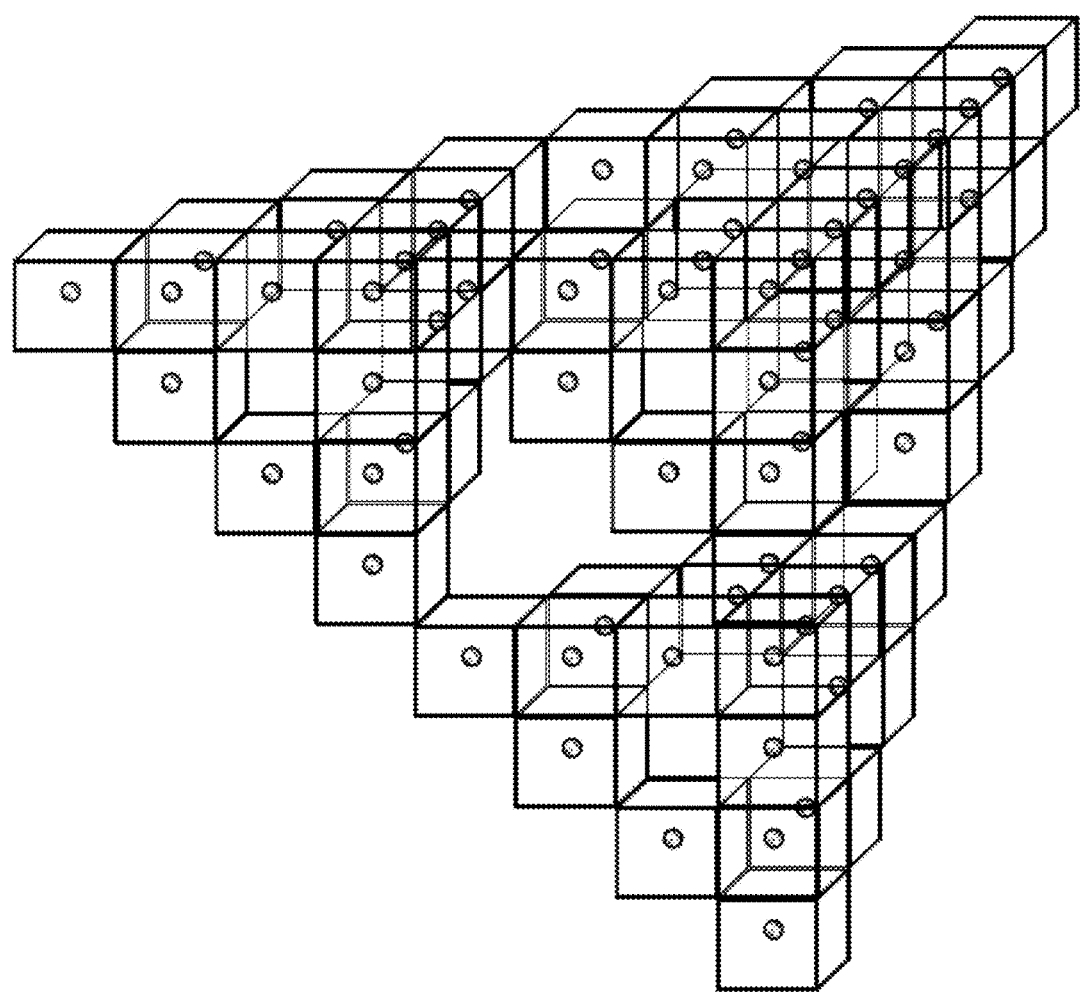
FIG. 7C is a drawing that is useful for understanding the concept of a level 3 fractal

The foregoing process can be extended to a third level of resolution in steps 214, 216 and 218. At step 214, the process can continue by identifying a plurality of level 3 fractals using a third level of resolution. At the third level of resolution, the block 300 from FIG. 3 is scaled up in size so that each sub-volume $302_0$-$302_7$ will contain a block of voxels of size 4×4×4. This scenario is illustrated in FIGS. 7A and 7B which shows a block cube $300_3$, where each sub-volume contains sixty-four (64) voxels. At the third level of resolution, sub-volumes $302_0$-$302_7$ will be marked only when they have a common level 2 fractal pattern contained therein. For example, in FIGS. 7A and 7B it will be noted that sub-volumes $302_3$, $302_5$, $302_6$, and $302_7$ all contain the same level 2 fractals and these sub-volumes are therefore marked. The marked sub-volumes at the third level of resolution can form 256 different three-dimensional geometric patterns. When the marked ones of sub-volumes $302_0$-$302_7$ form a three-dimensional pattern in cube $300_3$ which is the same pattern as the level 2 fractals contained in the marked sub-volumes, then the three-dimensional geometric patterns at the third level of resolution is referred to herein as a level 3 fractal. A level 3 fractal corresponding to the example shown in FIGS. 7A and 7B is illustrated FIG. 7C.

The processing advantageously continues in step 216 with the identification of points within the point cloud data which could be level 3 fractals if certain voxels were filled. This step will generally involve setting some limitations with regard to the number of points that can be missing relative to the formation of a complete level 3 fractal. For example, step 216 can involve identification of point cloud data that is missing one point or multiple points to complete the formation of a level 3 fractal. An acceptable number of missing points can be pre-defined within a computer application, or can be selected by a program operator. Once such point cloud formations with missing points have been identified in step 216, the voxels can be selectively filled in step 218 with points as needed to form a level 3 fractal. The number of points that are filled will be determined by the predetermined acceptable number of missing points as described above, while also ensuring that the fractal self similarity cost function is minimized.

The fractal self-similarity cost function can be represented as follows:

$$\text{CostFunction\_di, dj, dk} = \sum_{i=-n}^{n} \sum_{j=-n}^{n} \sum_{k=-n,}^{n} \min C(i, j, k)$$

where C(i, j, k) is the number of fractal patterns in the compression format. The variables (i, j, and k) refer to latitude, longitude, and height values. The variable n refers to the window size or in this case the voxel dimension of the fractal level currently being processed. The cost function is used to measure the amount of compression that occurs from a reduced representation of patterns within patterns.

The filling process as described herein advantageously increases the number of level 3 fractals identified within the point cloud, while minimizing a fractal self similarity function. Basically, if there is a gap or void in the data, and the adjacent three-dimensional areas within the point cloud have a certain level 2 fractal pattern, then it is likely that the data containing the gap or void should have the same level 2 fractal pattern. Accordingly, the gap or void is filled to mimic this certain pattern. In addition to filling voids in the data, this filling process has the further advantage that data in the neighborhood of the void can be compressed.

The three levels of resolution described herein are sufficient for understanding the invention. However, it should be understood that the invention can also use further levels of resolution to identify higher level fractals. Accordingly, step 220 can involve optionally identifying and filling points to generate higher level fractals while minimizing the fractal self-similarity function. Processing for such further levels of resolution would generally be similar to the processing in steps 214-216. All such embodiments are intended to be within the scope of the present invention.

Any suitable processing method can be used identify level 1, level 2 and level 3 fractals. According to one embodiment, the cube 3001, 3002, 3003 can be systematically scanned through the entire range of 3D point cloud data, and at each row and column position within the point cloud, the points contained within the cube can be evaluated to identify fractals at one level of resolution. Still, the invention is not limited in this regard and those skilled in the art will recognize that other processing methods could be devised for analyzing the three-dimensional point cloud to identify fractals. Further, it should be understood that the invention is not limited to use of a cube 300 that has sub-volumes arranged in a 2×2×2 geometric pattern as shown. Other size cubes having different sub-volume configurations (e.g., an arrangement of 3×3×3 sub-volumes or 2×3×3 sub-volumes) can also be used without limitation.

Referring once again to FIG. 2, the process can continue at 222 by generating a lookup table (LUT) for the 3D point cloud data in which the data is compressed by using various levels of fractals to represent patterns of data. FIG. 9 is useful for understanding how such an LUT can be generated. In FIG. 9, Location Number reference positions for a cube 300 within a set of three-dimensional point cloud data is listed in a first column identified as "Location No." Columns are also provided which list the X, Y and Z values associated with the reference positions listed in the Location No. column. These X, Y, and Z values define the positions of data points within the point cloud data and in this example correspond to the latitude, longitude and height parameters associated with example 3D data. A column labeled Resolution Level 1 lists the Pattern Reference Number identified at each particular location.

Recall from the discussion of FIG. 8 that each Pattern Reference Number refers to one of 256 possible patterns that can be defined by cube 300. Accordingly, at Location No. 1, pattern reference number 171 has been identified at Resolution Level 1. At Location No. 2, pattern reference number 11 has been identified. At location No. 3, pattern no. 129 has been identified. Pattern reference numbers are not listed for Resolution Level 2 and Resolution Level 3 where a level 2 or level 3 fractal is not detected. Accordingly, these columns are left blank in the case of Location Nos. 1, 2 and 3. However, note that in the case of location no. 4, a level 3 fractal has been identified. Specifically, there is shown at location no. 4 a level 3 fractal corresponding to a pattern reference number 11. Accordingly, these 64 points can be represented in a LUT with a single entry which indicates that a level 3 fractal, with pattern no. 11 is located at the X, Y, and Z coordinates corresponding to location no. 4.

The method continues at step 224 which involves pre-classifying one or more objects within a set of point cloud data based on an analysis of the fractal components identified in step 108. The fractal components are used to predict a class of objects to which the modeled object belongs. Generally, this analysis step will involve a comparison of the identified fractal components from step 108 to a database of known fractal components associated with certain types of objects. The fractal components for various different classes of objects as contained within the database will have varying degrees of correlation to the fractal components identified from the point cloud data. A modeled object can be assigned a pre-classification by determining which object class has fractal components with a highest correlation to those fractal components of the modeled object. The modeled object can be assigned to a single class for which its fractal components have a highest correlation, or can be assigned to a plurality of classes which show a relatively high degree of correlation. For example, the pre-classification for a modeled object can include two or more classes of objects showing the highest correlation to the fractal components identified in the point cloud data. The number of classes assigned in the pre-classification process can be fixed or can be determined based on a degree of correlation. For example, if the fractal components of a modeled object have a very high degree of correlation with one class of objects, then it may be appropriate to pre-classify the modeled object to that single class. But if the fractal components of a modeled object have only a moderate degree of correlation to a class of objects, then it can be preferred to assign several possible pre-classifications to the modeled object.

An evaluation of the correlation between fractal components for various classes, and the fractal components identified for a modeled object can proceed in any suitable way. In some embodiments, the correlation can be determined exclusively based on the presence and/or number of certain shapes of fractals. In other embodiments, spatial relationships between various fractal components can also be evaluated and compared to known spatial relationships between such fractals as stored in a database. Still, the invention is not limited in this regard and any suitable technique can be used for classifying modeled objects based on the fractal components identified as a result of the above-described spatial domain analysis.

Notably, the goal of the pre-classification step described herein is to identify, based on the fractal components, certain classes of objects that could be represented by the data model. As an example, consider the scenario where the presence of certain fractal components indicates that an object modeled by the point cloud data is most likely a vehicle. In other words, the fractal components may indicate the presence of certain slopes, curves, corners, and planar surfaces, that are indicative of a vehicle. But within the broad "vehicle" classification there could be several object classifications that are more specific. For example, the more specific classifications could include the classification automobile, pickup truck, sport-utility vehicle, armored personnel carrier, or tank. Accordingly, the result of the fractal analysis can include several classifications that potentially correspond to the modeled data. Notably, multiple models may share common features. As an example, trucks and cars have sides, wheel, and hood features. If these patterns were extracted, this pre-classification would be one of a class of a vehicle type, or a general vehicle object. This pre-classification can be improved later using level 2 and level 3 fractal patterns. This would be the case when there is a large database of object classes or strong similarity between neighboring classes.

Those skilled in the art will appreciate that the fractal analysis process described herein with respect to step 108 is essentially a spatial analysis of the point cloud data. However, the fractal analysis advantageously overcomes certain drawbacks of conventional spatial processing. For example, spatial analysis methods are known to sometimes produce false results caused by missing or spurious data points. In contrast, the fractal analysis method described herein advantageously provides a practical means to accurately identify (and replace) data points that are missing. The method also facilitates identification and removal of data points that are most likely spurious. Both of these functions are achieved by minimizing a fractal self-similarity function as described with respect to FIG. 2. Accordingly, the method for fractal-based spatial analysis of point cloud data described herein can provide improved results from the standpoint of a spatial solution. However, spatial analysis of point cloud data still has limitations and so the method continues as described below by performing a further analysis in the frequency domain. The additional step involving analysis in the frequency domain provide for a more robust identification of objects and their pose within a set of point cloud data. In a preferred embodiment, the frequency domain analysis preferably involves a phase congruency analysis as described below with respect to step 112. However, in anticipation of performing such frequency domain analysis, it is advantageous to use a mesh generating algorithm in step 110 for purposes of producing an interpolated, noise reduced version of the point cloud data.

Polygon meshes are well known in the field of computer graphics and will therefore not be described here in detail. Those skilled in the art will recognize that a polygon mesh is comprised of a set of vertices and edges that define polygon faces. The vertices in such a polygon mesh are usually defined by data points included in the point cloud data. The polygon faces are often triangles but can also be quadrilaterals or other types of polygons. The combination of vertices, edges and polygon faces that form the mesh collectively can define the shape of a three-dimensional object. The polygon mesh can be constructed with any one of several known algorithms. For example, one such algorithm is disclosed in Schnabel, R., Wahl, R. and Klein, R. (2007), Efficient RANSAC for Point-Cloud Shape Detection. Computer Graphics Forum, 26: 214-226. The algorithm described in Schnabel, et al. would work well to fill in the necessary structure in potentially noisy point cloud data, and can also serve to fill in any local voids or sparse areas that may exist in the data set. Accordingly, the Schnabel et al. paper is incorporated herein by reference. However, the invention is not limited in this regard and other algorithms can also be used for this purpose to facilitate production of an interpolated, noise reduced version of the three-dimensional point cloud data. In some embodiments, this step can also involve thinning of the point cloud data.

The importance of generating a polygonal mesh from the three dimensional point data is to provide both a reduction in noise and an interpolation of data between data points across the three dimensional space. Three dimensional data points originating from sensor data tend to be of non-uniform spacing and have inherent noise and voids. When applying the subsequent wavelet analysis described below, the data is required to be of uniform distribution regardless of the orientation from which it is viewed. Accordingly, the creation of a polygonal mesh can facilitate generation of a more uniform distribution of data points. The more uniform distribution is created by filling missing data points and by removing data points that constitute noise, thereby creating an enhanced or improved data set.

In step 112, the phase congruency analysis is advantageously performed on the interpolated, noise reduced version of the three-dimensional point cloud data that is generated in step 110. Phase congruency relies on the idea that phase information can be advantageously used to detect features in two-dimensional images. For example, it has been shown that phase congruency techniques can be used for detecting edges and corners. Phase congruency relies upon the idea that image features are perceived at points of maximum phase congruency in an image.

Phase congruency can be calculated using any suitable method known in the art. For example, wavelet transforms can be advantageously used for this purpose. Methods for calculating phase congruency using wavelet transforms are known in the art. See eg., P. Kovesi. Image Features from Phase Congruency Videre: Journal of Computer Vision Research, Summer 1999. Kovesi teaches the use of linear-phase filters, and more particularly, nonorthogonal wavelets that are in symmetric/antisymmetric quadrature pairs. In particular, Logarithmic Gabor functions (sometimes referred to herein as log-Gabor filters) are used for this purpose. As explained in Kovesi, phase congruency can be calculated by convolution of a signal with a quadrature pairs of filters as follows:

$$[en(x), on(x)] = [I(x)*M_n^e, I(x)*M_n^o],$$

where:

en(x), on(x) represent the even and odd response of each quadrature pair of filters;

I denotes the signal;

n represents the wavelet scale;

$M_n^e$ and $M_n^o$ denote even-symmetric (cosine) and odd-symmetric (sine) wavelets at a wavelet scale n. The outputs of this convolution operation from each quadrature pair of filters at a particular location in the signal will have an amplitude An, and a phase angle φn, where the index value n refers to the wavelet scale. The amplitude of the transform at a given wavelet scale n can then be represented as a response vector having an amplitude $$An(x) = \sqrt{e_n(x^2) + o_n(x^2)} \text{ and a phase}$$

$$\phi n(x) = a \tan 2(en(x), on(x)).$$

For each point x in a signal, a response vector can be generated for each scale n of filter, such that an array of these response vectors can be generated where the array includes response for a set of filters scales n. In other words, one can obtain for each point x in a signal, an array of these response vectors, where the array is comprised of one vector for each scale n of filter within a filter bank. Phase congruency can then be calculated at a particular location x within the signal. Once An(x) and φn(x) have been calculated, there are several different methods known in the art that can be used to determine phase congruency. For example Kovesi suggest:

$$PC(x) = \frac{\lfloor E(x) - T \rfloor}{\sum_n A_n(x) + \varepsilon}$$

where
⌊ ⌋ indicates that the enclosed quantity is equal to itself when its value is positive, and zero otherwise;

$$E(x) = \sqrt{F^2(x) + H^2(x)}$$

$$F(x) \approx \sum_n e_n(x)$$

$$H(x) = \sum_n o_n(x)$$

$$\sum_n A_n(x) \approx \sum_n \sqrt{e_n(x)^2 + o_n(x)^2}$$

and
T=a noise estimate value.

Still, the invention is not limited in this regard, and other methods are also possible for calculating phase congruency. Notably a group of wavelet filters that are used to calculate phase congruency (each of which is defined by the scale n) can be chosen such that the transfer function of each filter overlaps with neighboring filters within the group. In this way, the sum of the transfer functions of filters in the group can form a relatively uniform coverage of one portion of the frequency spectrum. This arrangement can be advantageous because phase congruency is often of particular interest to the extent that it can be found to exist over a certain range of frequencies.

The calculation of phase congruency outlined above applies to signals in one dimension. In the present invention, these techniques for evaluating phase congruency are extended to the three-dimensional domain for purposes of identifying objects. The pre-classification performed in step 108 is used to guide the phase congruency analysis in step 112, in which the presence of certain three-dimensional geometric primitives are identified in the data model. Specifically, based on the object pre-classification performed in step 108, certain banks of wavelet filters are chosen which are known to be responsive to certain types of geometric primitives. A bank of one or more wavelet filters can be constructed to search for specific geometric primitives or a combination of geometric primitives. As used herein, the phrase geometric primitives refers to features modeled by the data which include edges, lines and various classes of surfaces. The surfaces can include planar surfaces and various curved surfaces. Geometric primitives can also include three-dimensional geometric shapes, such as spheres, cubes or boxes, toroids, cylinders, and pyramids. The three dimensional primitive concept can also be extended to include more complex three-dimensional shapes. In the present invention, various combinations of three-dimensional primitives can be used as markers upon which object identification can be determined. A specific combination of three-dimensional primitives identified as being present within a data model is used to infer that a particular object is represented by the data model. The phase congruency analysis of step 112 will now be described in further detail with respect to FIGS. 10A and 10B.

Figure 10A:
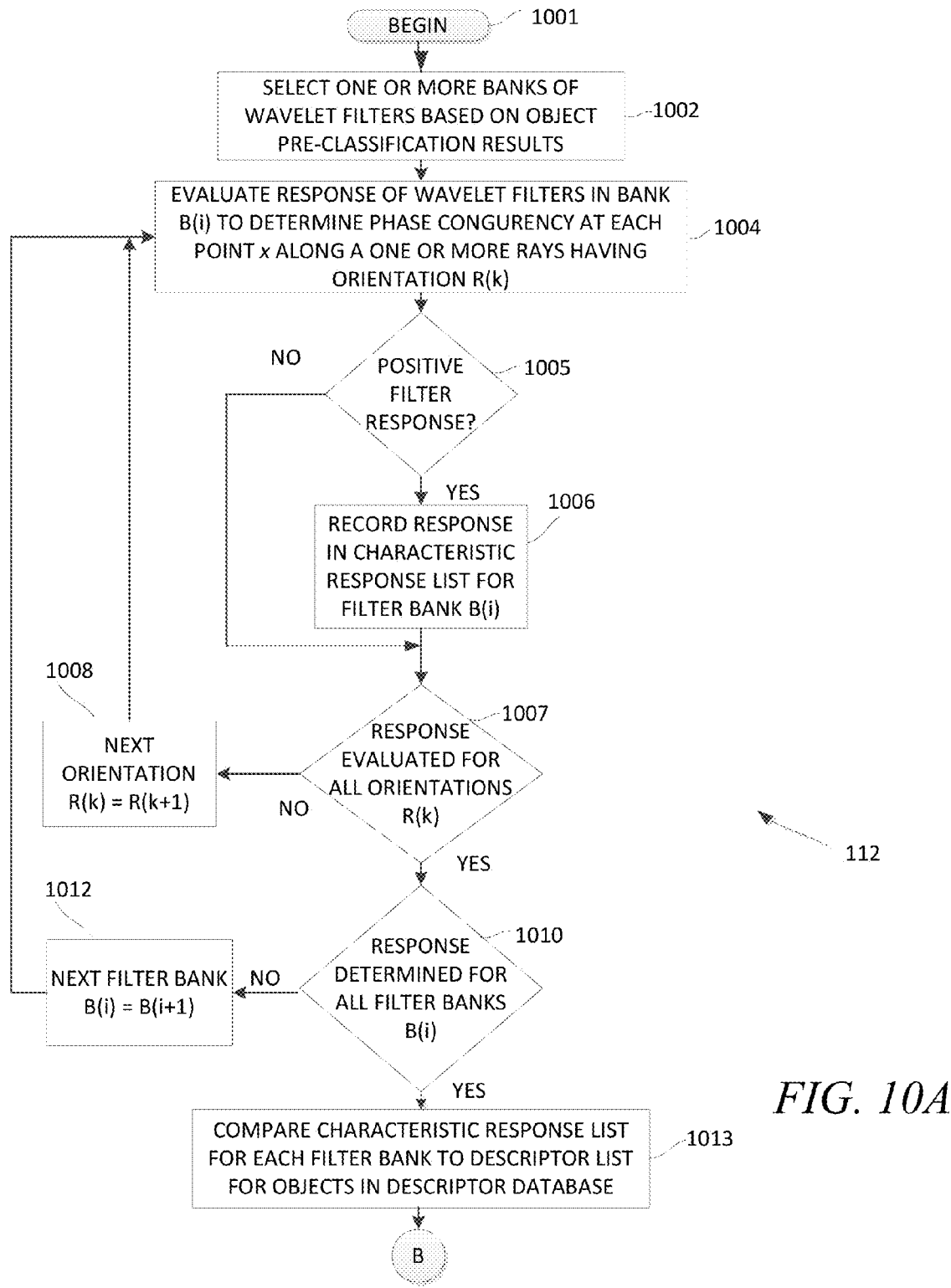
FIGS. 10A and 10B are flowcharts that are useful for understanding a phase congruency analysis portion of the process in FIG. 1.
Figure 10B:
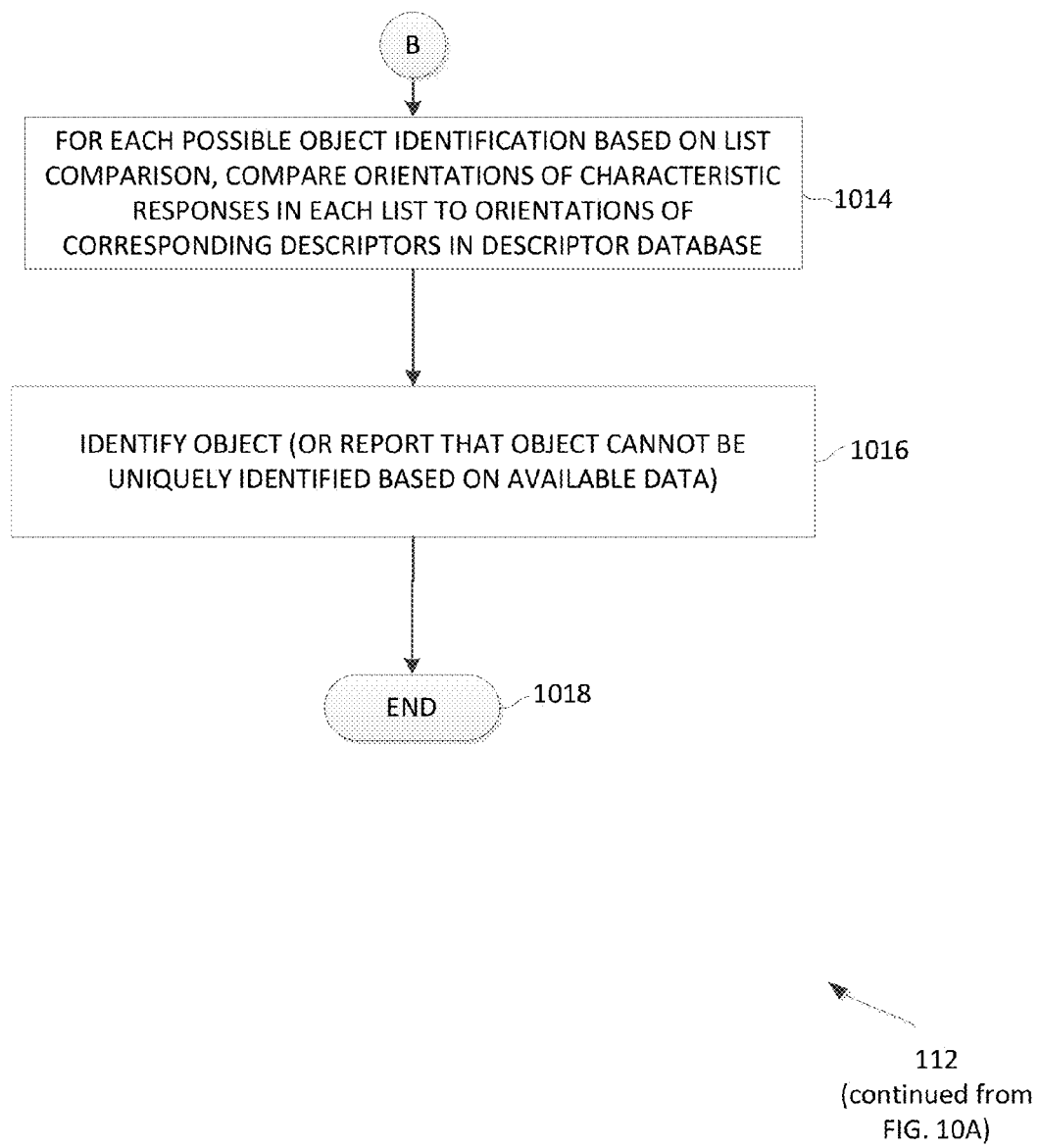

The process in FIG. 10A can begin in step 1001 and continues to step 1002. In step 1002 one or more banks of wavelet filters are selected which will be used to perform the phase congruency analysis. The wavelet filters are preferably chosen based on the object pre-classification results in step 108. Recall that the goal of the phase congruency analysis is to identify a combination of one or more geometric primitives which facilitate identification of a modeled object. To this end, a bank of wavelet filters can be chosen to search for a single geometric primitive. Alternatively, a bank of wavelet filters could be selected to search for multiple geometric primitives. In some instances, a single wavelet filter having some value of n may be sufficient to identify a particular geometric primitive. In other instances, two or more wavelet filters may be desirable for identifying a particular geometric primitive, with each filter having a different value of n. The number of filters needed to make a positive identification of a particular geometric primitive, and the preferred values of n can be chosen by experimentation or computer simulation methods. The number of wavelet filters and the values of n chosen are preferably selected so that the phase congruency analysis will provide results indicating the presence of a particular geometric primitive with a satisfactory degree of confidence. Different geometric primitives may require different numbers of wavelet filters in order to achieve this result.

A single geometric primitive can be sufficient to positively identify some objects, but other objects will only be identifiable based on the presence of two or more geometric primitives. Accordingly, a bank of wavelet filters can be arranged to identify a single geometric primitive or a plurality of geometric primitives. If the filter bank contains filters for a plurality of geometric primitives, then the combination of geometric primitives can advantageously correspond to the primitives associated with a particular object. In such embodiments, a single filter bank can be designed for identifying a particular type of object. Alternatively, each filter bank can be tuned for purposes of identifying different individual geometric primitives, in which case certain combinations of filter banks can be used to identify particular objects containing certain combinations of geometric primitives. From the foregoing, it will be understood that an object can be identified based on a phase congruency response as measured by a single filter bank or based on a combination of filter banks.

In step 1002, filter banks can be chosen which are sufficient to identify several different objects. The group of filter banks chosen can be selected based on the pre-classification results of step 108. For example, if the pre-classification results indicate that a modeled object could be an automobile, then one or more banks of wavelet filters are chosen which are known to be particularly sensitive to one or more geometric primitives associated with an automobile. If the pre-classification results indicate that the modeled object could also be a High Mobility Multipurpose Wheeled Vehicle (HMMWV), then a second set of filter banks could be chosen which are known to be particularly sensitive to one or more geometric primitives associated with the HMMWV. If the pre-classification process further indicated that the modeled object could be a pickup truck, then a third set of filter banks could be chosen which are known to be particularly sensitive to one or more geometric primitives associated with the shape of a pickup truck. Each of the three sets of filter banks could include a single wavelet filter or multiple wavelet filters, depending on the particular object to be identified. The phase congruency response (or responses) that are obtained for each of the three sets of filter banks could then be evaluated as hereinafter described in step 1004.

Figure 11:
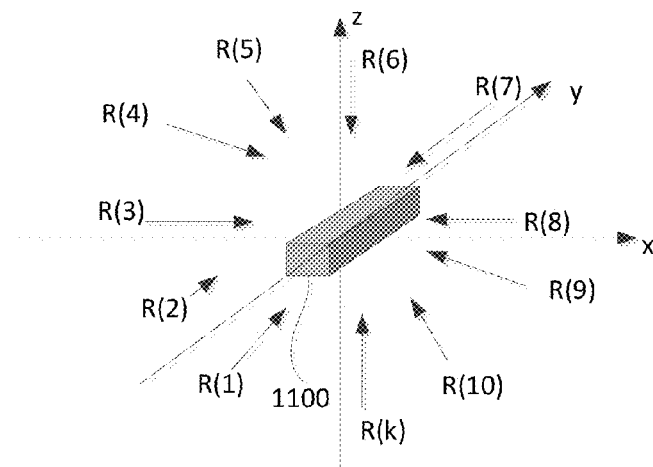
FIG. 11 is a drawing that is useful for understanding a phase congruency analysis performed over a plurality of orientations with respect to a geometric primitive type object.
Figure 12:
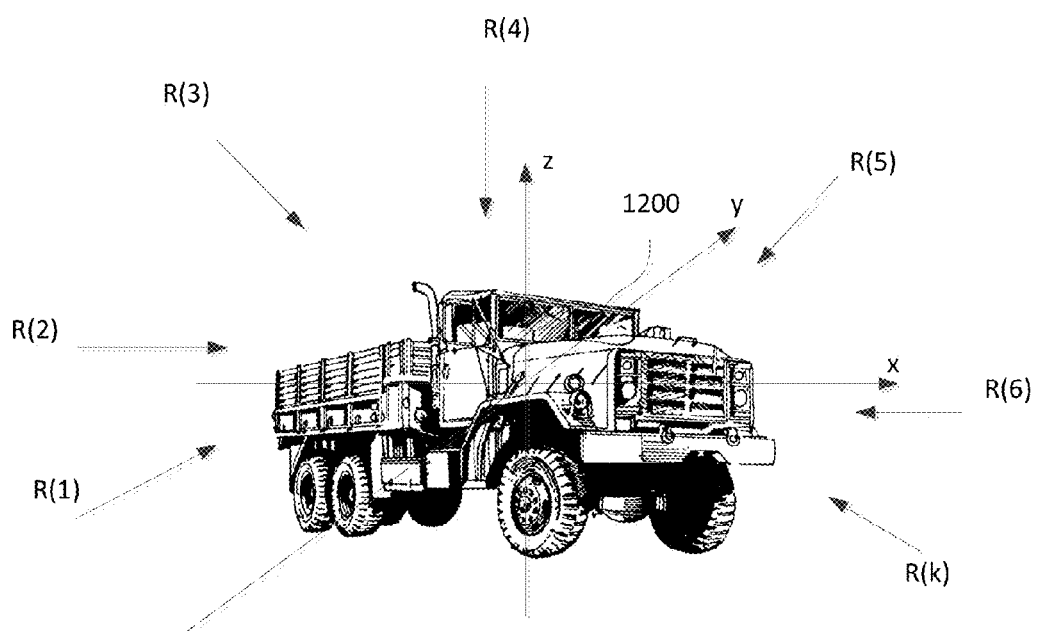
FIG. 12 is a drawing that is useful for understanding a phase congruency analysis performed over a plurality of orientation with respect to a relatively complex object comprised of a plurality of geometric primitives.

In step 1004, the response of the wavelet filter (or filters) in each selected filter bank is evaluated at a plurality of orientations with respect to the three dimensional model produced in step 110. Notably, a wavelet filter analyzes a set of points along a linear path or ray. The orientation of the linear path is important for purposes of the phase congruency analysis because the wavelet filter will often have a greater response to a geometric primitive at one orientation versus another. Accordingly, in order to obtain a more complete characterization of the geometric primitives that are contained within a model, it is advantageous for a response of each wavelet filter in a filter bank B(i) to be determined for a plurality of different orientations relative to the data model. This concept is illustrated in FIG. 11 in the context of a single geometric primitive 1100 that is defined by a set of data points comprising a three dimensional point cloud. The data points comprising geometric primitive 1100 will generate different wavelet filter responses as the wavelet is evaluated with respect to a plurality of different linear paths or rays aligned at different orientations R(1), R(2), R(3) ... R(k). The exact number of orientations included in the analysis is not critical, but should generally include at least about four to sixteen different orientations. These orientations are preferably selected so that they are distributed about the x, y, and z axes used to define the point cloud. The same concept is illustrated in FIG. 12, which shows that a modeled object 1200 can be substantially more complex than a single geometric primitive.

A single ray at each orientation R(1), R(2), R(3) ... R(k) is shown in FIGS. 11 and 12 to generally illustrate the idea that point cloud data associated with an object 1100, 1200 can be analyzed at a plurality of different orientations. However, in an actual implementation, analysis along a single line would be likely to miss many points in the data representing geometric contours of interest. Accordingly, it is preferred to analyze the point cloud data along a plurality of rays associated with each orientation rather than at just along a single ray. In such embodiments, an orientation R(1), R(2), R(3) ... R(k) is advantageously defined by a plane rather than a single ray. For each such orientation, a plurality of sub-orientations are then defined by rays that exist within the plane. For example, a set of parallel rays, equally spaced and aligned within the plane, can be used for this purpose. In such embodiments, a response of each wavelet filter can be evaluated along a line defined by each of the parallel rays. Alternative embodiments are also possible in which the rays are not parallel but instead fan out from a single point at different equally spaced angles. For convenience, the invention shall be described with respect to FIGS. 13-17 using the former approach involving a plurality of rays arranged in parallel. In either scenario, the important idea to be appreciated is that a wavelet response is evaluated in step 1004 at one or more rays at each main orientation R(k) defined by a plane.

Figure 13A:
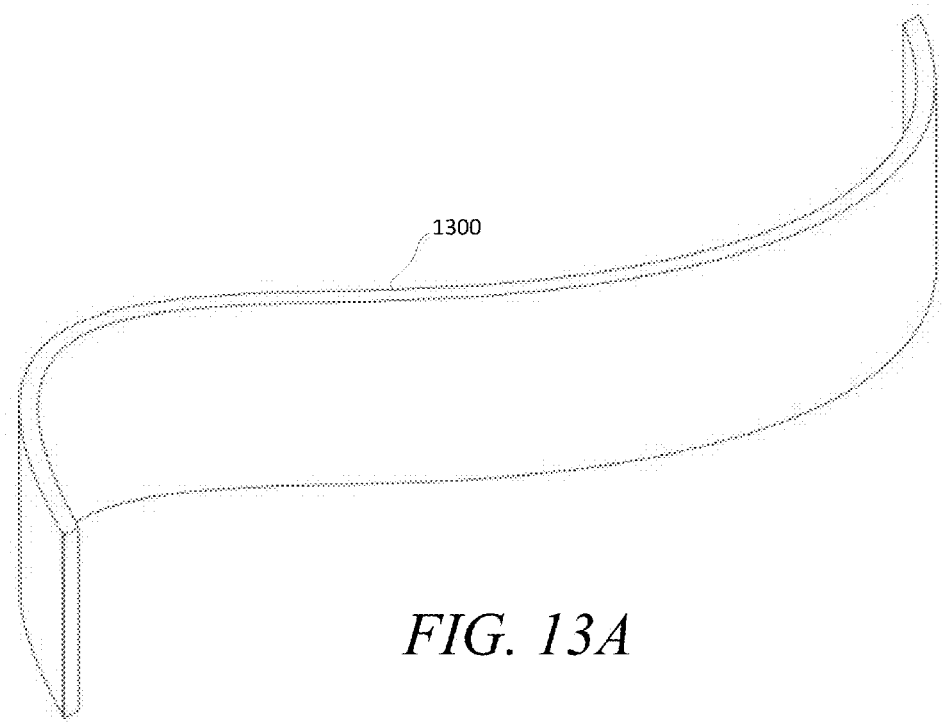
FIG. 13A is a perspective view of an exemplary 3D contour.
Figure 13B:
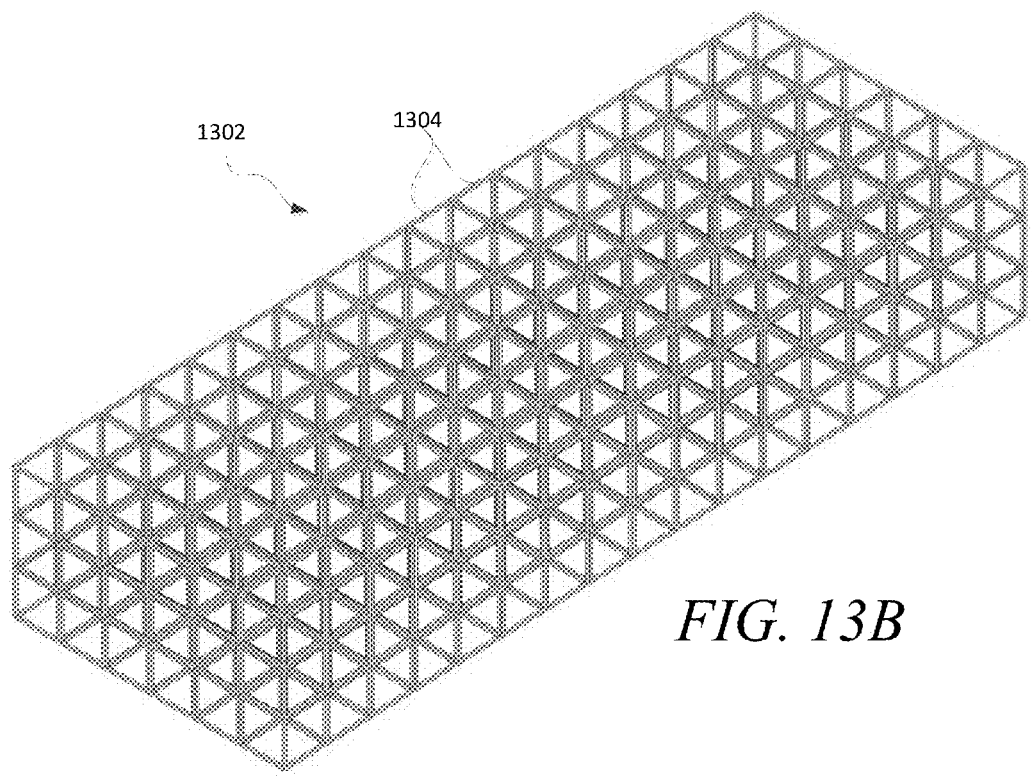
FIG. 13B is an exemplary 3D voxel space including a plurality of voxels.
Figure 13C:
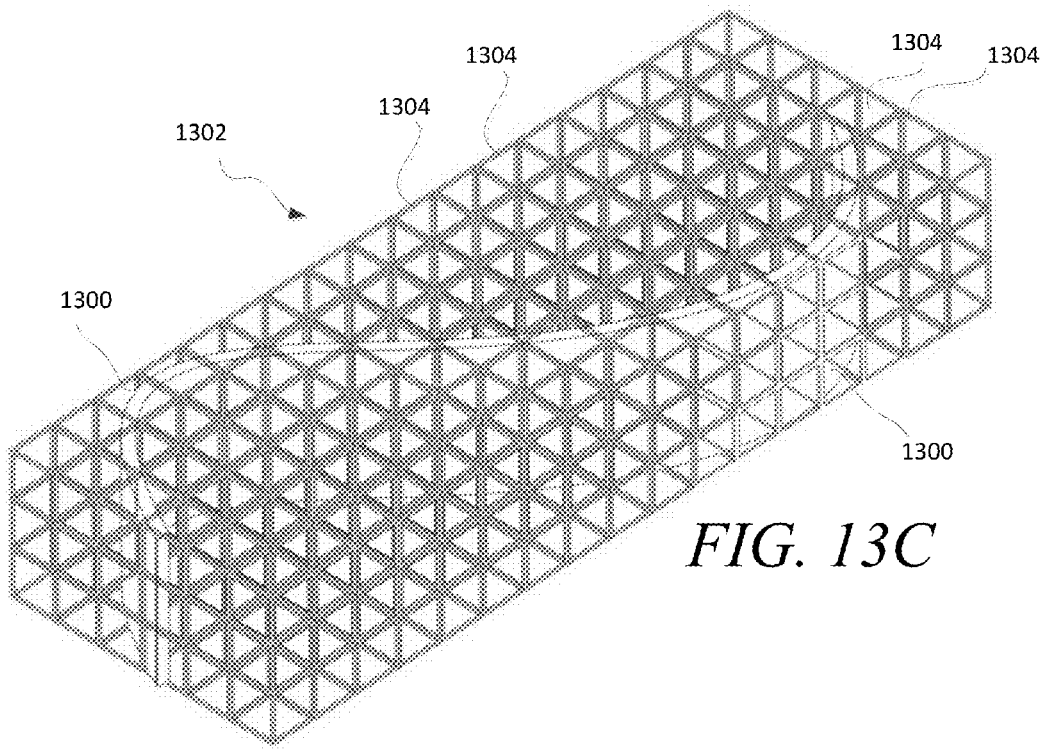
FIG. 13C shows the 3D contour of FIG. 13A disposed or residing in the 3D voxel space of FIG. 13B.
Figure 13D:
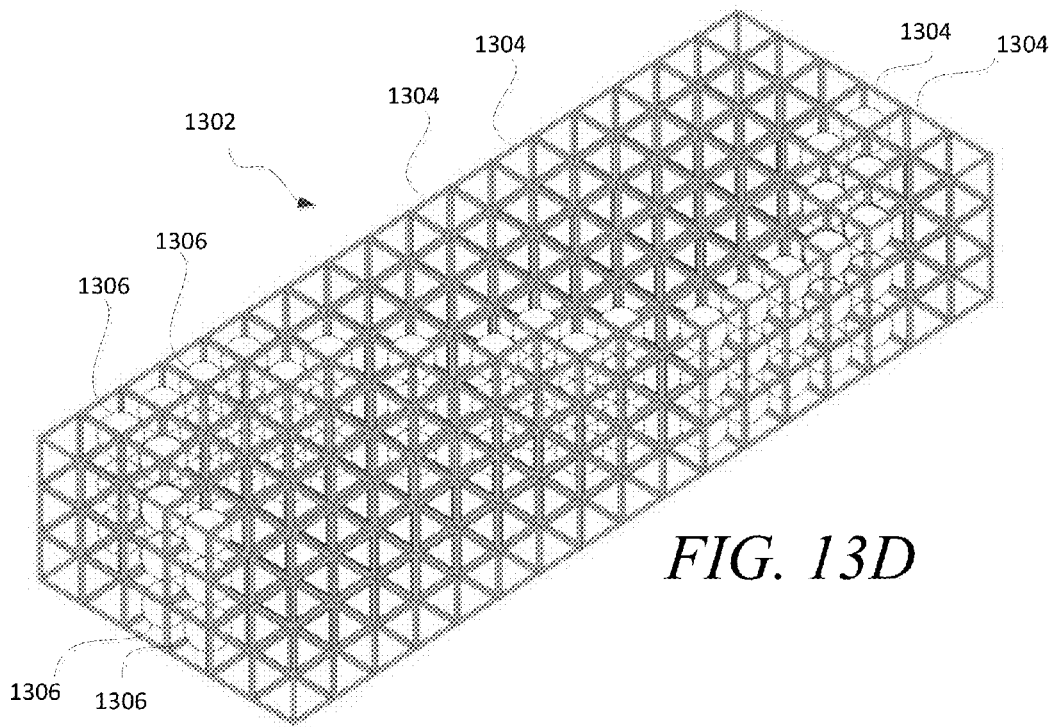
FIG. 13D shows a plurality of voxels in 3D voxel space occupied by data points which model the 3D contour in FIG. 13A.

In order to more fully understand this wavelet filter analysis process in step 1004, consider the simple 3D contour 1300 shown in FIG. 13A, which contour is to be modeled in a voxel space 1302 shown in FIG. 13B. The voxel space is comprised of a plurality of voxels 1304. Referring now to FIG. 13C, the 3D contour is shown disposed or residing in the 3D voxel space. If the 3D contour was modeled with 3D point cloud data, then a plurality of the voxels comprising 3D voxel space 1302 would be occupied by data points 1306 as shown in FIG. 13D. The locations of the data points would be such that the occupied voxels would generally correspond to the shape of the 3D contour 1300.

Figure 14A:
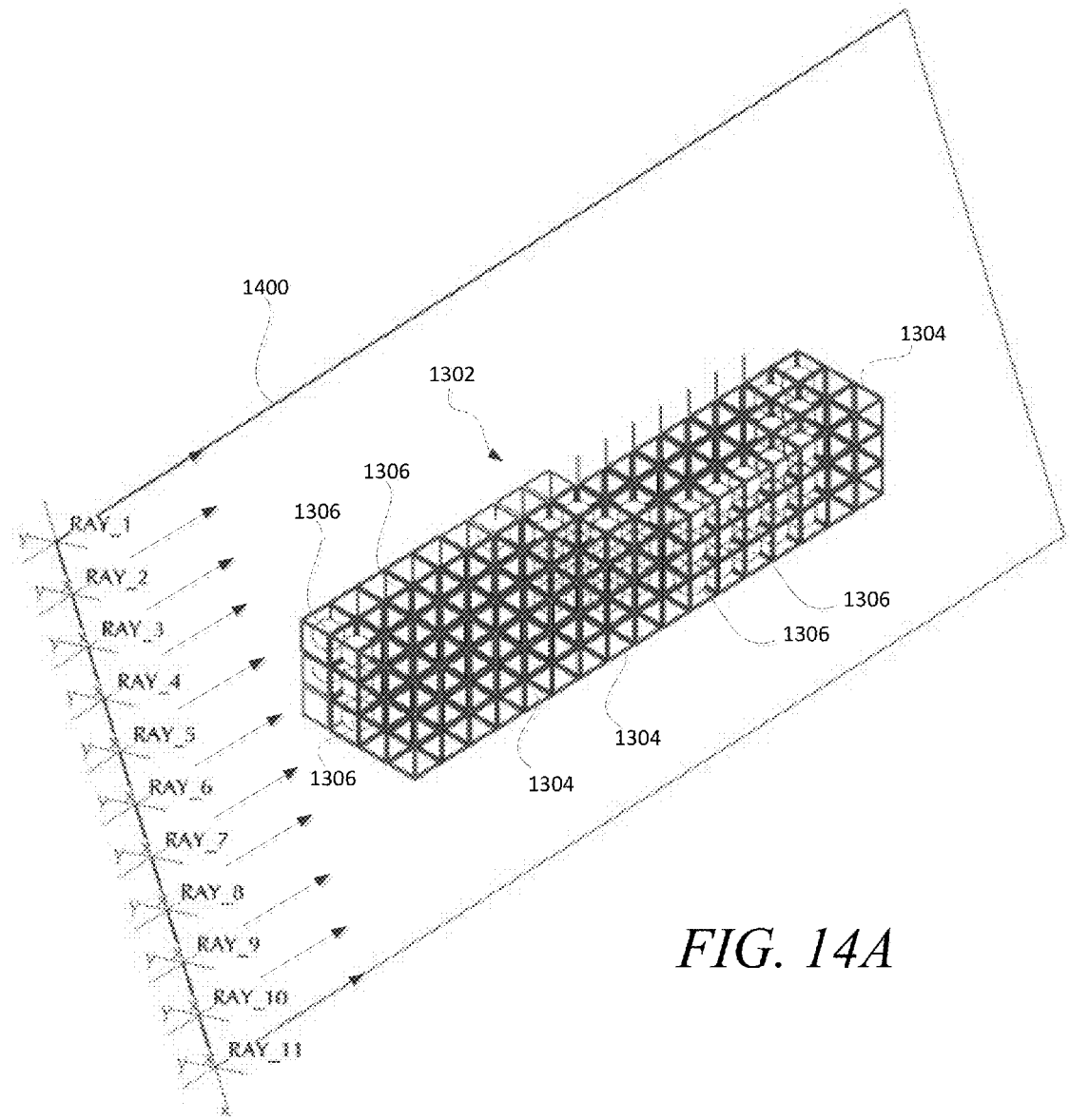
FIG. 14A is a perspective view which shows a projection plane intersecting the 3D voxel space of FIG. 13D.
Figure 14B:
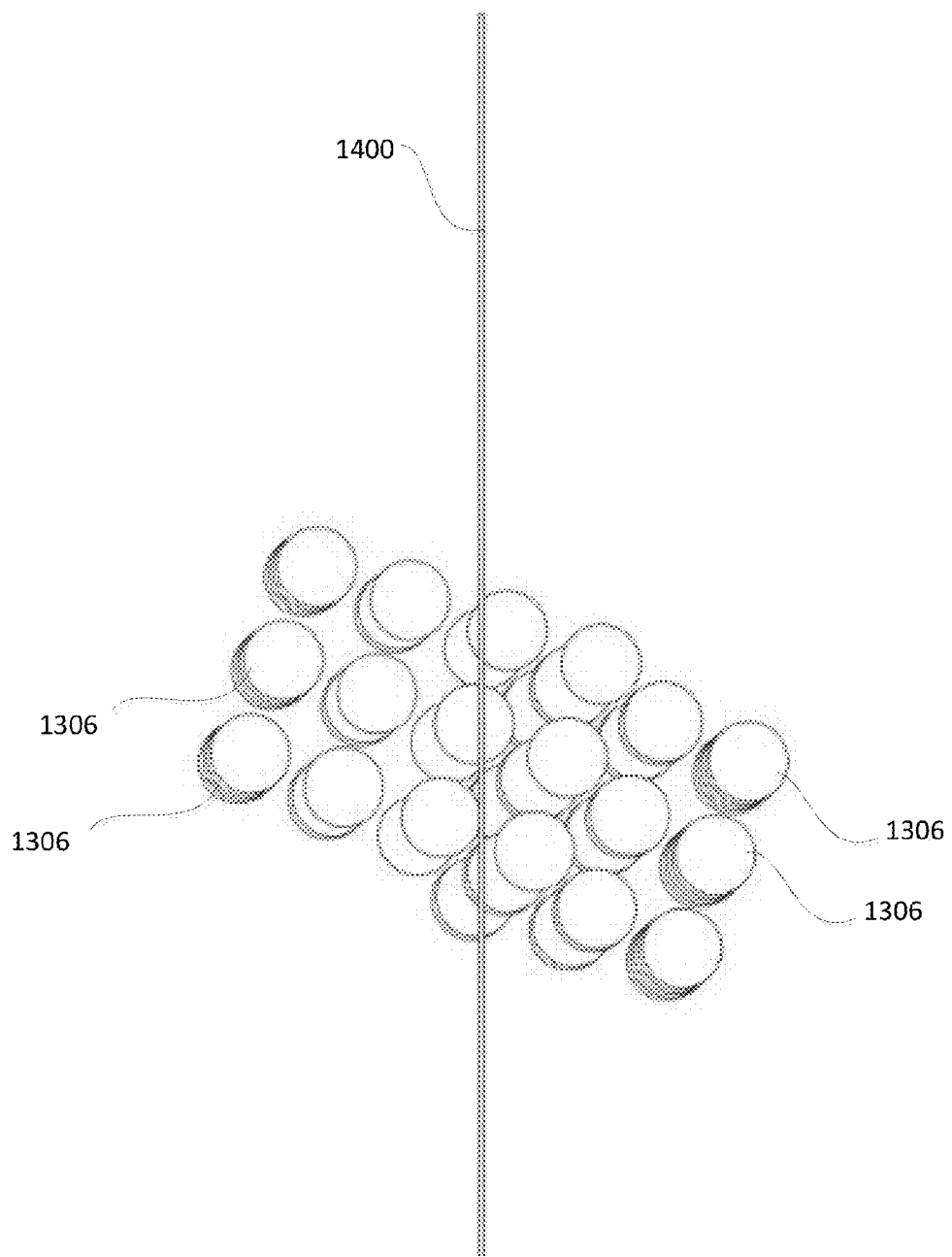
FIG. 14B is a side view of the projection plane and 3D voxel space in FIG. 14A.

As shown in FIG. 14A, a projection plane 1400 intersects the voxel space 1302 containing occupied voxels. The projection plane defines a main orientation at which one or more wavelet filters will be evaluated. A side view of the same projection plane 1400 and data points 1306 from FIG. 14A is shown in FIG. 14B. Note that in FIG. 14C, the outline of voxels 1304 are intentionally not shown in the drawing so as to avoid obscuring the invention. A front view of the same projection plane 1400 and data points from FIG. 14A is shown in FIG. 14C with the outline of voxels 1304 again omitted for greater clarity.

Figure 14C:
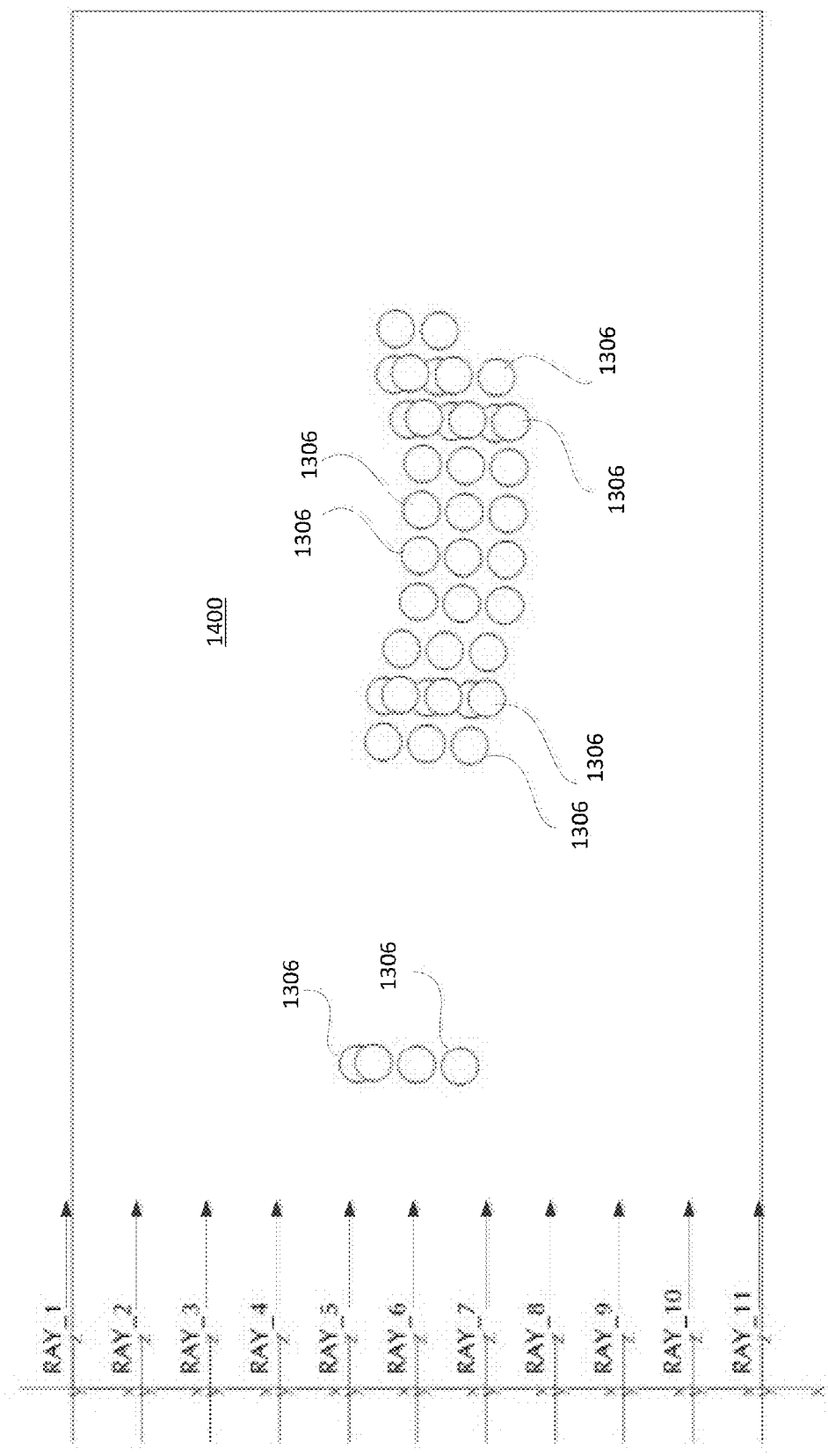
FIG. 14C is a front view of the projection plane and 3D voxel space in FIG. 14A.

In FIGS. 14A-14C, one can observe that a projection plane 1400 can partially define an orientation in step 1004 for purposes of evaluating a wavelet filter response. More particularly, wavelet filter responses can be evaluated along a plurality of parallel rays (e.g. Ray 1 through Ray 11 in FIG. 14A) which are defined in alignment with the projection plane 1400. Each of these rays represents one of a plurality of uniformly spaced wavelet sources. Recall that a filter bank can include a plurality of wavelet filters of different scales n. In an embodiment of the invention, a wavelet filter response for a particular filter of scale n can be evaluated along each ray (e.g. Ray 1 through Ray 11 in FIG. 14A). Thereafter, the next filter of scale n+1 can be evaluated at each ray, and so on, until all filters within the bank have been evaluated along all rays defined within the projection plane. After each filter within the filter bank has been evaluated in this way, the process can continue to the next projection plane having a different orientation.

Figure 15A:
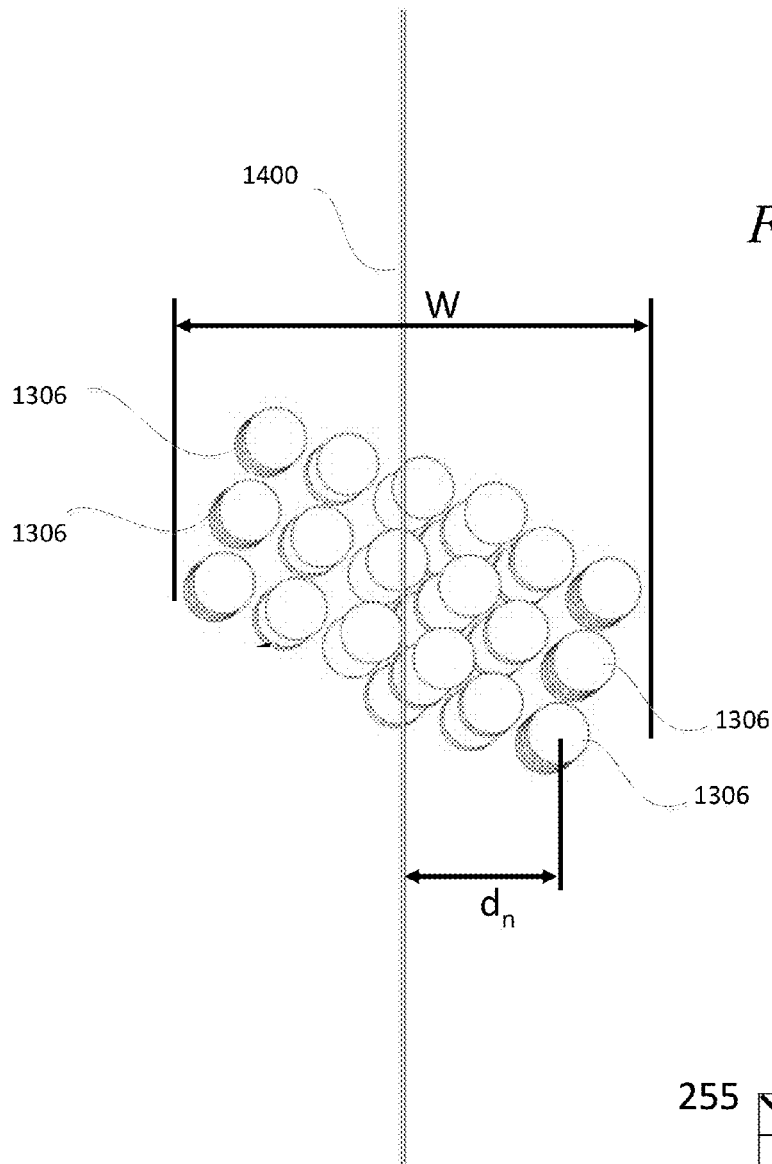
FIG. 15A is a side view of the projection plane and 3D voxel space in FIG. 14A that is useful for understanding how a distance from the projection plane in FIG. 14B can be used to determine an intensity value of a pixel.
Figure 15B:
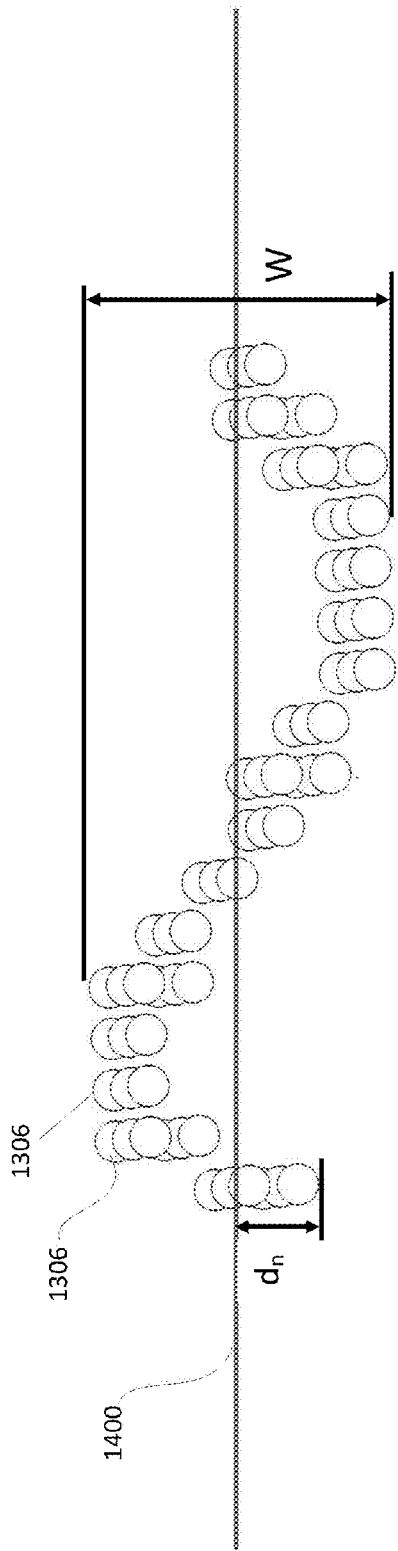
FIG. 15B is a top view of the projection plane and 3D voxel space in FIG. 14A that is useful for understanding how a distance from the projection plane can be used to determine an intensity value of a pixel.

Referring now to FIGS. 15A and 15B, there is provided a side view and a top view respectively of the projection plane 1400 and data points (occupancy data) 1306. FIGS. 15A and 15B are useful for understanding the manner in which occupancy data information is translated or projected to the projection plane 1400. As illustrated therein, the data points (occupancy data) 1306 within some range+/−W/2 are evaluated with respect to their distance dn from the projection plane 1400, which distance is measured normal to the projection plane. Each of the data points 1306 is projected onto the projection plane 1400 and the points thus projected are used to form a two dimensional (2D) image on the projection plane.

Figure 16:
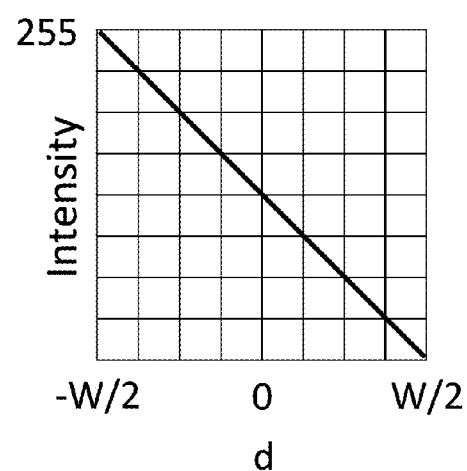
FIG. 16 is a linear function which is useful for understanding how a distance from the projection plane can be used to determine an intensity value of a pixel in a 2D image.

The overall image intensity contribution of an individual voxel n to the projected image on the 2D projection plane is related to its distance dn. According to a preferred embodiment, intensity contribution of each voxel drops with distance in accordance with some defined relationship. For example, FIG. 16 shows a linear plot which can be used to determine an intensity contribution of an individual voxel based on its distance from the projection plane. Still, the invention is not limited in this regard and other non-linear relationships are also possible. The intensity of a given pixel in the 2D image projected onto the projection plane 1400 is determined by summing the contributions of each voxel that overlaps that pixel. The resulting 2D image projected onto the projection plane 1400 is then analyzed along a plurality of scan lines using one or more wavelet filters within a filter bank. The scan lines are defined as a row of pixels in the 2D image that are intersected by one of the rays (e.g. Ray 1 through Ray 11) defining sub-orientations within FIG. 14A.

Figure 17:
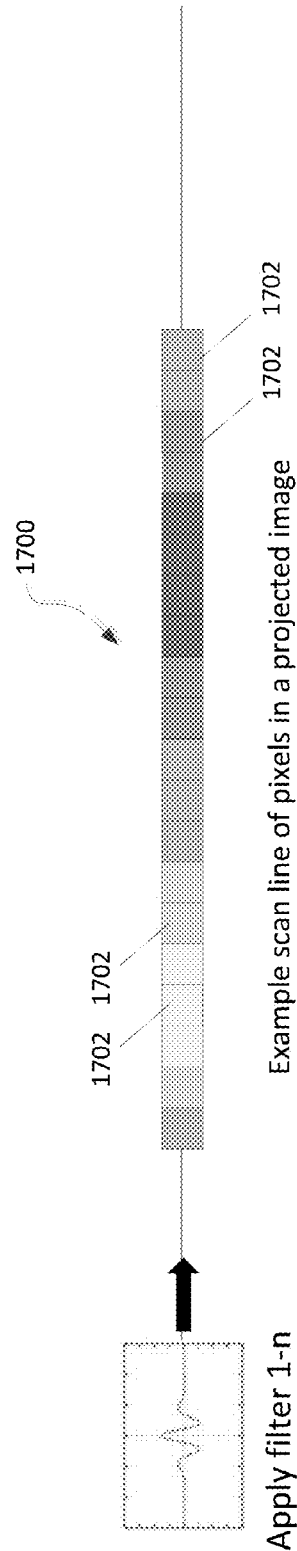
FIG. 17 is an example of a scan line which can be analyzed using a wavelet filter.

Referring now to FIG. 17, there is shown an example of a scan line 1700 comprised of pixels 1702 which could be produced within a 2D image using the projection process described above. The scan line shown would be one of many such scan lines in the two dimensional image. The scan line shown in the figure does not necessarily correspond to the occupancy data in FIGS. 13-15, but is instead merely provided as an example to illustrate the way that a two dimensional image projected onto an image plane can be analyzed. Each pixel in the scan line will have some intensity value assigned in the manner described above. A response of the wavelet filter is determined based on the varying intensity values along the scan line corresponding to a particular ray/orientation.

In step 1004, a response is calculated for each wavelet filter in a filter bank B(i), at one or more rays associated with each main orientation R(k) as described above. Most filters will produce some manner of numerical response when applied to the data, and each response will have a peak magnitude at some point along a particular ray. If the peak magnitude exceeds a given threshold, then the result is deemed to be a positive response at step 1005 and can be added to a list of positive responses obtained for a particular data set under evaluation. In general, a positive response will be an indication that a particular notable characteristic of an object has been detected. As such, these positive responses, when they occur, can be thought of as a "characteristic response" insofar as they indicate the presence of a particular physical characteristic of a sensed object as represented by the data. When such positive or characteristic responses are identified, they are advantageously recorded in a database at step 1006 as part of a list of characteristic responses which have been observed with respect to the particular data set and particular filter bank.

The list of characteristic responses stored in the database will generally indicate the particular filter for which the positive response was obtained, the main orientation R(k) and particular ray within the main orientation at which a positive response was obtained, and the voxel location where the peak response occurred. For example, an entry in the list at step 1006 could indicate that a positive response was obtained from a particular filter n, bank B(i), with a peak response centered at voxel m, at main orientation R(k), and ray r. The peak voxel location will be determined or known based on the main orientation R(k) of the intersecting plane, the particular ray for which the response is being calculated within a main orientation, and the pixel location where the peak occurs along a particular ray in the representative intensity image.

Following step 1006, the method continues on to step 1007 where a determination is made as to whether a response has been evaluated for the wavelet filters in a filter bank B(i) at all orientations R(k). If not, then the value of k is incremented in step 1008 and the bank of wavelet filters is evaluated at the next orientation. Once the wavelet filters in a filter bank B(i) have been evaluated at all k orientations (1007: Yes), the process continues on to step 1010 which determines whether wavelet responses have been evaluated for all of the filters B(i) which have been selected as a result of the pre-classification analysis. If not, then the value of "i" is incremented in step 1012 and the process returns to step 1004. A list of characteristic responses can be generated for each filter bank. When all banks of filters have been evaluated at all orientations, the process continues on to step 1013.

Once all filters in banks B have been processed or evaluated at all orientations R, a list of characteristic responses for each filter bank will have been obtained for the particular data set which is under evaluation. These characteristic response lists will then be analyzed as described below, by comparing each list of characteristic responses to a previously prepared descriptor database containing a list of specific descriptors associated with various types of objects and object classes.

As used herein the term "descriptor" refers to a single data element that is used to describe a portion of a target model. A combination of individual descriptors will fully and uniquely describe an object. In order to provide a suitable descriptor database, an idealized point-based model is generated for each object a system is intended to be capable of identifying. Geometric symmetry and pattern repetition data is collected using the fractal analysis methods described herein and this information is stored in the object model/descriptor database. This data can be used to pre-classify an observed or sensed object using the fractal methods as described herein. Wavelet filters are similarly applied to the idealized point based model and measured responses are calculated for each wavelet filter. For purposes of generating the database, responses are calculated for all of the available wavelet filters, rather than just a subset of the available filters. The idealized point based model is exposed to all available filters since it is not yet known which filters will produce the greatest response at which orientations. Determining this information and storing it in a meaningful way is the primary purpose of the database generation process. Once all of this information has been acquired for the idealized point-based model, it is stored and can be used as a point of comparison when evaluating measured or sensed data. More particularly, the descriptor database obtained with model data can be compared to the list of characteristic responses obtained when analyzing actual data to facilitate object identification.

The list of characteristic responses obtained for each filter bank B(i) will generally be a subset of the descriptors contained in the descriptor database. A first course effort at down selection can be performed at step 1013 using simply a list of descriptors (i.e. without consideration of orientation data) and comparing this list to the list of characteristic responses for each filter bank. Accordingly, the list of characteristic responses obtained for each filter bank B(i) which has been evaluated can be compared to descriptors for each type of object or object class as stored in the descriptor database. When a list of characteristic responses sufficiently corresponds to a stored list of descriptors for a particular type of object, it will be an indication that a possible object identification. At this stage, only a "possible" object identification would exist because this simple preliminary comparison would not include an evaluation of the relative orientation at which the various characteristic responses were identified. A list of characteristic responses can be said to sufficiently correspond to a stored list of descriptors when a certain portion or percentage of the entire list of descriptors is represented in the list of characteristic responses. For example, sufficient correspondence can be declared when 70% of the descriptors for a particular object are present in the list of characteristic responses. Of course, the invention is not limited in this regard and a system designer can set the criteria for the extent of correspondence required to satisfy this first course effort at down-selection. Alternatively, if more than one filter bank has been evaluated, the characteristic response list for the filter bank with the greatest degree of correspondence can be selected at 1013.

To obtain a definitive identification of an object, the characteristic responses should match not only the list of descriptors for a particular object, but should also occur at the same relative orientations. Accordingly, a second, more detailed analysis may be performed at step 1014 where the relative orientations between the descriptors will be examined. Using this secondary analysis step, the system will either be able to determine at step 1016 a unique match, or report that no unique match exists using the given data. As a side note, it will be known to the system at this point what further information would be required to make a unique determination. For example, the system could determine that additional data must be collected at a particular object orientation in order to facilitate a unique object identification. This information identifying the additional required data could be passed to a higher level system orchestrator or planner, which could direct the sensing and object ID system to collect additional data and reprocess. Following step 1016, the process can terminate in step 1018 or can continue with a next batch of data.

The present invention can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The methods described herein can be implemented on a computer system. The computer system can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. Further, while the invention can be practiced using a single computer, the phrase "computer system" shall be understood to include any collection of one or more computing devices that individually or jointly execute a set (or multiple sets) of instructions to perform any one or more of the methodologies discussed herein.

Figure 18:
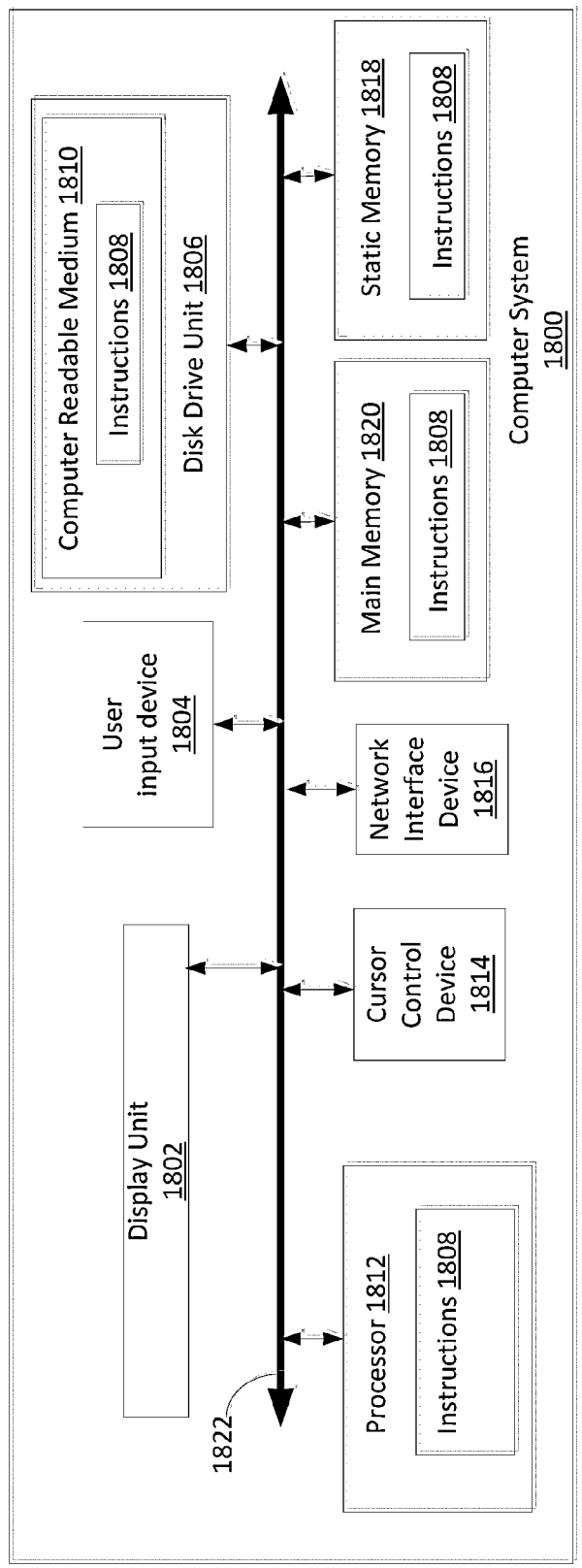
FIG. 18 is a block diagram that is useful for understanding a computer system in which the inventive methods described herein can be implemented.

Referring now to FIG. 18, an exemplary computer system 1800 is shown. The computer system 1800 includes a processor 1812 (such as a central processing unit (CPU), a graphics processing unit (GPU, or both), a disk drive unit 1806, a main memory 1820 and a static memory 1818, which communicate with each other via a bus 1822. The computer system 1800 can further include a display unit 1802, such as a video display (e.g., a liquid crystal display or LCD), a flat panel, a solid state display, or a cathode ray tube (CRT)). The computer system 1800 can include a user input device 1804 (e.g., a keyboard), a cursor control device 1814 (e.g., a mouse) and a network interface device 1816.

The disk drive unit 1806 includes a computer-readable storage medium 1810 on which is stored one or more sets of instructions 1808 (e.g., software code) configured to implement one or more of the methodologies, procedures, or functions described herein. The instructions 1808 can also reside, completely or at least partially, within the main memory 1820, the static memory 1818, and/or within the processor 1812 during execution thereof by the computer system. The main memory 1820 and the processor 1812 also can constitute machine-readable media. Point cloud data from step 104 can be stored in disk drive unit 1806 or in main memory 1820. One or both of these memory locations can also be used to store a fractal data, and/or a database of reference responses needed to evaluate phase congruency results.

Those skilled in the art will appreciate that the computer system architecture illustrated in FIG. 18 is one possible example of a computer system. However, the invention is not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described herein are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein. In the various embodiments of the present invention a network interface device 1816 connected to a network environment communicates over the network using the instructions 1808.

While the computer-readable storage medium 1810 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

We claim:

1. A method for identifying one or more objects, comprising:
using a computer processing device to perform a fractal analysis on a data set comprised of a plurality of data points having positions distributed in three-dimensions;
based on said fractal analysis, identifying at least one object class that is potentially represented by a spatial distribution of said data points, said object class specifying a category of physical object;
performing a phase congruency analysis of said data set based on said object class identified by said fractal analysis; and
performing a further object identifying step based on said phase congruency analysis.

2. The method according to claim 1, wherein said phase congruency analysis is performed at a plurality of orientations relative to a coordinate system in which said data points are distributed.

3. The method according to claim 2, further comprising using a plurality of phase congruency responses respectively obtained at said plurality of orientations to obtain a composite response.

4. The method according to claim 3, further comprising determining a correlation between said composite response and at least one predetermined reference response for performing said further object identifying step.

5. The method according to claim 1, wherein said phase congruency analysis is performed using a wavelet based method.

6. The method according to claim 5, further comprising selecting at least one of a plurality of wavelet filters for said phase congruency analysis based on said object class as determined by said fractal analysis.

7. The method according to claim 1, further comprising performing said wavelet based method using at least one log-Gabor filter.

8. The method according to claim 1, further comprising processing said data set to form an interpolated noise reduced version of the data set prior to performing said phase congruency analysis.

9. The method according to claim 1, wherein said further object identifying step comprises confirming said object class that is represented by said spatial distribution of said data points.

10. The method according to claim 1, wherein said further object identifying step comprises identifying an object sub-class that is potentially represented by said spatial distribution of said data points, said object sub-class specifying a category of said physical object more precisely as compared to said object class.

11. The method according to claim 1, wherein said further object identifying step comprises identifying at least one three-dimensional contour represented by said spatial distribution of said data points.

12. The method according to claim 1, wherein said fractal analysis identifies a plurality of object classes, and said further object identifying step comprises selecting one of said object classes.

13. The method according to claim 1, wherein said fractal analysis further comprises identifying within said data set a plurality of data points which form a plurality of level 1 fractals, and at least one of a level 2 fractal and a level 3 fractal.

14. The method according to claim 1, wherein said fractal analysis further comprises filling at least one missing data point to form a fractal selected from the group consisting of a level 2 fractal and a level 3 fractal.

15. A system for identifying one or more objects, comprising:
a computer processing device programmed with a set of instructions to perform the following steps:
perform a fractal analysis on a data set comprised of a plurality of data points having positions distributed in three-dimensions;
based on said fractal analysis, identify at least one object class that is potentially represented by a spatial distribution of said data points, said object class specifying a category of physical object;
perform a phase congruency analysis of said data set based on said object class identified by said fractal analysis; and
perform a further object identifying step based on said phase congruency analysis.

16. The system according to claim 15, wherein said phase congruency analysis is performed at a plurality of orientations relative to a coordinate system in which said data points are distributed.

17. The system according to claim 16, wherein said computer processing device is further programmed to use a plurality of phase congruency responses respectively obtained at said plurality of orientations to obtain a composite response.

18. The system according to claim 17, wherein said computer processing device is further programmed to determine a correlation between said composite response and at least one predetermined reference response for performing said further object identifying step.

19. The system according to claim 15, wherein said phase congruency analysis is performed using a wavelet based method.

20. The system according to claim 19, wherein said computer processing device is further programmed to select at least one of a plurality of wavelet filters for said phase congruency analysis based on said object class as determined by said fractal analysis.

21. The system according to claim 15, wherein said computer processing device is further programmed to perform said wavelet based method using at least one log-Gabor filter.

22. The system according to claim 15, wherein said computer processing device is further programmed to process said data set to form an interpolated noise reduced version of the data set prior to performing said phase congruency analysis.

23. The system according to claim 15, wherein said computer processing device further performs said object identifying step by identifying at least one three-dimensional contour that is represented by said spatial distribution of said data points.

* * * * *